United States Patent
Asano et al.

(10) Patent No.: US 9,049,418 B2
(45) Date of Patent: Jun. 2, 2015

(54) DATA PROCESSING APPARATUS, DATA PROCESSING METHOD, AND PROGRAM

(75) Inventors: Yasuharu Asano, Kanagawa (JP); Kenichiro Kobayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 805 days.

(21) Appl. No.: 12/651,799

(22) Filed: Jan. 4, 2010

(65) Prior Publication Data

US 2010/0179972 A1    Jul. 15, 2010

(30) Foreign Application Priority Data

Jan. 9, 2009   (JP) ................ P2009-003688

(51) Int. Cl.
| | | |
|---|---|---|
| H04N 9/87 | (2006.01) | |
| G06F 17/30 | (2006.01) | |
| G11B 27/28 | (2006.01) | |
| H04N 5/783 | (2006.01) | |
| H04N 21/439 | (2011.01) | |
| H04N 21/4402 | (2011.01) | |
| H04N 21/45 | (2011.01) | |
| H04N 21/488 | (2011.01) | |
| H04N 21/845 | (2011.01) | |
| H04N 9/82 | (2006.01) | |

(52) U.S. Cl.
CPC .............. *H04N 9/8715* (2013.01); *G06F 17/30* (2013.01); *G11B 27/28* (2013.01); *H04N 5/783* (2013.01); *H04N 9/8227* (2013.01); *H04N 21/439* (2013.01); *H04N 21/440236* (2013.01); *H04N 21/4508* (2013.01); *H04N 21/4884* (2013.01); *H04N 21/8456* (2013.01)

(58) Field of Classification Search
CPC ....................................................... G06F 17/30
USPC ....................................................... 715/202
See application file for complete search history.

(56) References Cited

U.S. PATENT DOCUMENTS

| | | | | |
|---|---|---|---|---|
| 6,363,380 | B1* | 3/2002 | Dimitrova | 707/740 |
| 8,150,678 | B2* | 4/2012 | Sagawa | 704/2 |
| 2007/0074244 | A1* | 3/2007 | Miyamori | 725/34 |
| 2009/0210825 | A1* | 8/2009 | Kubo et al. | 715/838 |

FOREIGN PATENT DOCUMENTS

| | | |
|---|---|---|
| JP | 2003-304486 | 10/2003 |
| JP | 2008-124551 | 5/2008 |

OTHER PUBLICATIONS

Kanda et al.; "Open-Vocabulary Keyword Detection From Super-Large Scale Speech Database", IEEE Signal Processing Society, International Workshop on Multimedia Signal Processing, pp. 939-944, (2008).

* cited by examiner

*Primary Examiner* — Kavita Padmanabhan
*Assistant Examiner* — Tionna Burke
(74) *Attorney, Agent, or Firm* — Finnegan, Henderson, Farabow, Garrett & Dunner, L.L.P.

(57) ABSTRACT

A data processing apparatus includes a text acquisition mechanism acquiring texts to be used as keywords which will be subject to audio retrieval, the texts being related to contents corresponding to contents data including image data and audio data; a keyword acquisition mechanism acquiring the keywords from the texts; an audio retrieval mechanism retrieving utterance of the keywords from the audio data of the contents data and acquiring timing information representing the timing of the utterance of the keywords of which the utterance is retrieved; and a playback control mechanism generating, from image data around the time represented by the timing information, representation image data of a representation image which will be displayed together with the keywords and performing playback control of displaying the representation image corresponding to the representation image data together with the keywords which are uttered at the time represented by the timing information.

25 Claims, 19 Drawing Sheets

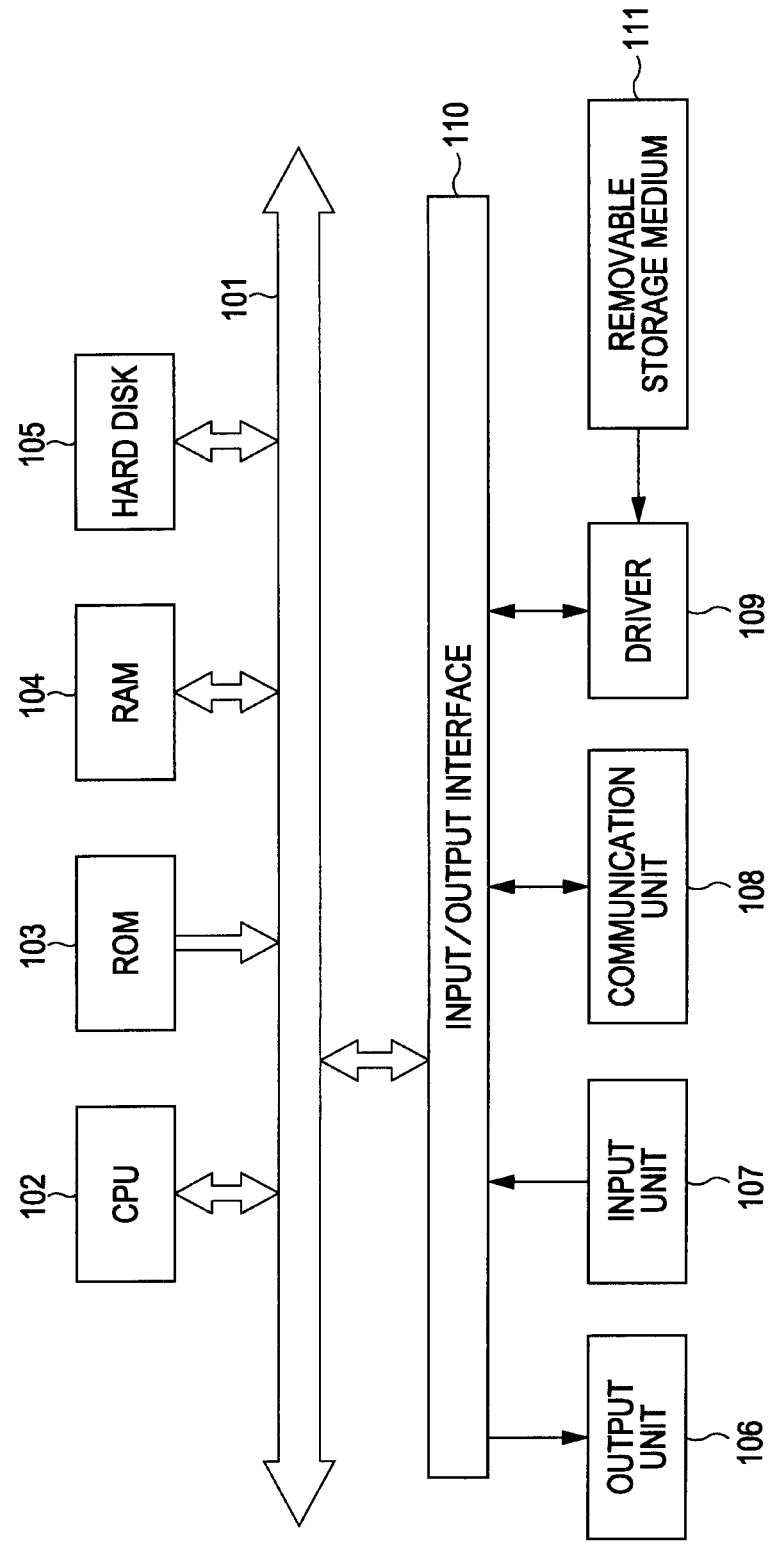

DATA PROCESSING APPARATUS, DATA PROCESSING METHOD, AND PROGRAM

BACKGROUND OF THE INVENTION

1. Field of the Invention

The present invention relates to a data processing apparatus, a data processing method, and a program. More particularly, the present invention relates to a data processing apparatus, a data processing method, and a program capable of enabling users to grasp easily the details of contents such as television broadcast programs, for example.

2. Description of the Related Art

Digest playback is a contents playback method that allows users to grasp easily the details (outlines) of contents including images and voices, such as television broadcast programs.

According to the digest playback, contents are divided into several scenes based on the characteristic amount of images or voices contained in the contents. Then, images for digest playback such as thumbnails of representative images (e.g., the opening images of respective scenes) are generated and displayed.

Moreover, as a method for effectively extracting a dialog part contained in contents with a relatively low processing load at the time of generating images for digest playback, Japanese Unexamined Patent Application Publication No. 2008-124551, for example, discloses a method of extracting the playback periods of the voices of a dialog during the playback periods of voices being played back in a caption display period.

SUMMARY OF THE INVENTION

However, when only the thumbnails of the opening images of the respective scenes are displayed in the digest playback, it may be difficult for users to grasp the details of a scene from the thumbnail of the scene.

For example, in the case of a news program (report program), the opening images of the scenes of the news program are mainly composed of the image of a newscaster (announcer).

In this case, the thumbnails displayed by the digest playback will be mainly composed of the thumbnail image of the newscaster. Therefore, it is difficult to grasp the details of each scene only by watching the thumbnails.

It is therefore desirable to enable users to grasp easily the details of contents including images and voices.

According to an embodiment of the present invention, there is provided a data processing apparatus or a program for causing a computer to function as the data processing apparatus including text acquisition means for acquiring texts to be used as keywords which will be subject to audio retrieval, the texts being related to contents corresponding to contents data including image data and audio data; keyword acquisition means for acquiring the keywords from the texts; audio retrieval means for retrieving utterance of the keywords from the audio data of the contents data and acquiring timing information representing the timing of the utterance of the keywords of which the utterance is retrieved; and playback control means for generating, from image data around the time represented by the timing information among the image data of the playback contents, representation image data of a representation image which will be displayed together with the keywords and performing playback control of displaying the representation image corresponding to the representation image data together with the keywords which are uttered at the time represented by the timing information.

According to another embodiment of the present invention, there is provided a data processing method for enabling a data processing apparatus to perform the steps of: acquiring texts to be used as keywords which will be subject to audio retrieval, the texts being related to contents corresponding to contents data including image data and audio data; acquiring the keywords from the texts; retrieving utterance of the keywords from the audio data of the contents data and acquiring timing information representing the timing of the utterance of the keywords of which the utterance is retrieved; and generating, from image data around the time represented by the timing information among the image data of the playback contents, representation image data of a representation image which will be displayed together with the keywords and performing playback control of displaying the representation image corresponding to the representation image data together with the keywords which are uttered at the time represented by the timing information.

According to the embodiment of the present invention, the texts which are related to contents corresponding to contents data including image data and audio data are acquired and which will be used as keywords which will be subject to audio retrieval, are acquired, and the keywords are acquired from the texts. Moreover, the utterance of the keywords is retrieved from the audio data of the contents data, and timing information representing the timing of the utterance of the keywords of which the utterance is retrieved is acquired. Furthermore, representation image data of a representation image which will be displayed together with the keywords are generated from image data around the time represented by the timing information among the image data of the playback contents. Furthermore, the representation image corresponding to the representation image data is displayed together with the keywords which are uttered at the time represented by the timing information.

The data processing apparatus may be an independent apparatus and may be an internal block included in one apparatus.

The program may be provided by being transferred via a transmission medium or being recorded in a recording medium.

According to the embodiment of the present invention, a user is able to grasp easily the details of scenes included in contents. That is to say, for example, in contents including images and voices, the timings of a scene in which predetermined words are descriptive of the details are acquired, and images around the timings are displayed together with the predetermined words. As a result, the user will be able to grasp easily the details of scenes included in the contents.

BRIEF DESCRIPTION OF THE DRAWINGS

FIG. 19 is a block diagram illustrating an exemplary configuration of a computer according to an embodiment of the present invention.

DESCRIPTION OF THE PREFERRED EMBODIMENTS

Figure 1:
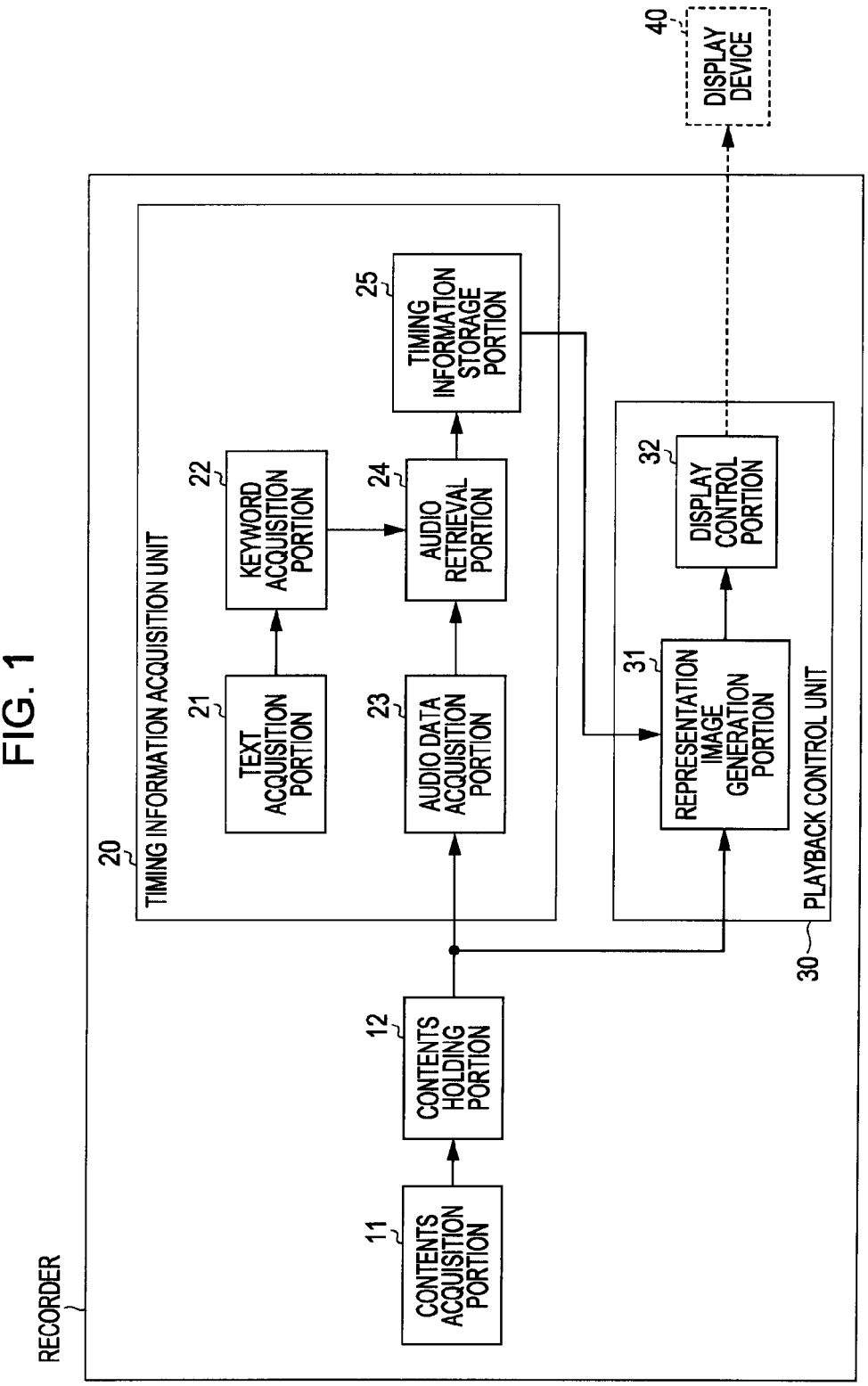
FIG. 1 is a block diagram illustrating an exemplary configuration of a recorder according to an embodiment of the present invention.

Exemplary Configuration of Recorder According to Embodiment of Present Invention FIG. 1 is a block diagram illustrating an exemplary configuration of a recorder according to an embodiment of the present invention.

Referring to FIG. 1, the recorder is an HD (hard disk) recorder, for example, and includes a contents acquisition portion 11, a contents holding portion 12, a timing information acquisition unit 20, and a playback control unit 30.

The contents acquisition portion 11 is configured to acquire contents data of contents (for example, images and voices) as the programs of television broadcasts, for example, and supply the acquired contents data to the contents holding portion 12.

When contents data are associated with metadata of contents corresponding to that contents data, the contents acquisition portion 11 also acquires the metadata and supplies them to the contents holding portion 12.

That is to say, the contents acquisition portion 11 is a tuner that receives broadcast data of television broadcasts such as digital broadcasts, and that is configured to acquire the contents data by receiving TS (transport stream), for example, as broadcast data which are transmitted (broadcast) from a non-illustrated broadcasting station, and supply the contents data to the contents holding portion 12.

Here, the broadcast data include contents data as data of the programs which are contents. Furthermore, the broadcast data may include EPG (electronic program guide) data and the like as the metadata of programs (metadata associated with programs (contents)) if necessary.

Moreover, the contents data as the data of programs include at least image data of programs and audio data associated with the image data. Furthermore, the contents data may sometimes include caption data such as closed caption. When caption data are included in the contents data, the contents data may further include display time information representing the display time at which the caption corresponding to the caption data is displayed.

The contents acquisition portion 11 may be configured, for example, by a communication interface that performs communication via a network such as a LAN (local area network) or the Internet. In this case, the contents acquisition portion 11 acquires the contents data by receiving contents data and metadata (for example, so-called iEPG data) which can be downloaded from a server on a network.

Furthermore, the contents acquisition portion 11 may acquire the contents data by playing back the contents recorded on package media such as DVDs.

The contents holding portion 12 is configured, for example, by a large-capacity recording (storage) medium such as an HD (hard disk) and is configured to record (store or hold) therein the contents data supplied from the contents acquisition portion 11 if necessary.

When the metadata of contents (programs) such as EPG data are supplied from the contents acquisition portion 11 to the contents holding portion 12, the contents holding portion 12 records therein the metadata.

The recording of contents data in the contents holding portion 12 corresponds to video-recording (including programmed video-recording, so-called automatic video-recording, dubbing, and the like).

The timing information acquisition unit 20 functions as a data processing apparatus that acquires timing information representing the time at which keywords are uttered during the playback of the contents of which the contents data are recorded in the contents holding portion 12.

Specifically, the timing information acquisition unit 20 includes a text acquisition portion 21, a keyword acquisition portion 22, an audio data acquisition portion 23, an audio retrieval portion 24, and a timing information storage portion 25.

The text acquisition portion 21 is configured to acquire texts to be used as keywords, which will be used when the audio retrieval portion 24 performs audio retrieval, and supply the texts to the keyword acquisition portion 22.

The keyword acquisition portion 22 is configured to acquire keywords, which are character strings to be used as targets of audio retrieval, from the texts supplied from the text acquisition portion 21 and supply the keywords to the audio retrieval portion 24.

Here, the keyword acquisition portion 22 may acquire an entirety of the texts supplied from the text acquisition portion 21 as one keyword.

Moreover, the keyword acquisition portion 22 may perform natural language processing such as morphology analysis on the texts from the text acquisition portion 21 so as to decompose the texts into morphemes, thus acquiring an entirety or a part of the morphemes constituting the texts as the keywords.

Here, the keyword acquisition portion 22 may acquire reading information (phonemes) of morphemes, for example, thus acquiring, based on the reading information, words with long reading (namely, words with a predetermined number or more of phonemes) as the keywords.

Furthermore, the keyword acquisition portion 22 may acquire morphemes with a predetermined occurrence frequency or more as the keywords while acquiring only self-sufficient words excluding attached words such as auxiliary words.

Furthermore, the keyword acquisition portion 22 may acquire morphemes, of which the part of speech is a proper noun, as the keywords.

In addition to the above, the keyword acquisition portion 22 may acquire character strings, which are extracted by a so-called characteristic expression extraction technique, for example, as the keywords.

The audio data acquisition portion 23 is configured to acquire audio data by reading the audio data of contents data of target contents among the contents, of which the contents data are recorded in the contents holding portion 12, and supply the audio data to the audio retrieval portion 24.

The audio retrieval portion 24 is configured to perform audio retrieval of retrieving an utterance of the keywords supplied from the keyword acquisition portion 22 from the audio data of the target contents supplied from the audio data acquisition portion 23. In addition, the audio retrieval portion 24 acquires timing information representing the timing of the utterance of a keyword of which the utterance is retrieved: that is to say, the time (timing) at which the keyword is uttered is acquired based on the beginning of the target contents, for example.

Here, as the timing information, time codes may be used, for example. Moreover, as the timing of the utterance of keywords, the timing of the beginning or ending of an utterance may be used, for example, and besides, any timing during the utterance may be used.

With respect to the target contents, the audio retrieval portion 24 generates a timing information list, in which keywords, of which the utterance is retrieved, and the timing information representing the timing of the utterance thereof are registered in a correlated manner, and supplies the timing information list to the timing information storage portion 25.

The timing information storage portion 25 is configured to store the timing information list of the target contents, supplied from the audio retrieval portion 24, and the target contents (or identification information thereof) in a correlated manner.

The playback control unit 30 is configured to perform playback control of controlling playback such as digest playback of playback contents, in which among the contents of which the contents data are recorded in the contents holding portion 12, contents which are designated to be played back are used as the playback contents.

Specifically, the playback control unit 30 includes a representation image generation portion 31 and a display control portion 32.

The representation image generation portion 31 is configured to acquire image data of the contents data of the playback contents from the contents holding portion 12 and also acquire the timing information list of the playback contents from the timing information storage portion 25.

Moreover, the representation image generation portion 31 generates, from image data around the time represented by the timing information registered in the timing information list among the image data of the playback contents, representation image data of a representation image which will be displayed together with keywords which are correlated with the timing information.

Here, as the representation image, so-called thumbnails which are reduced size images obtained by reducing original images may be used, for example.

The representation image generation portion 31 supplies pairs of keywords and representation image data corresponding to the timing information to the display control portion 32. That is to say, sets of keywords correlated with the timing information and representation image data generated from the image data around the time represented by the time point are supplied to the display control portion 32.

The display control portion 32 displays the representation image corresponding to the representation image data supplied from the representation image generation portion 31 together with keywords which are paired with the representation image data on a display device 40 such as a TV (television receiver).

In the recorder having the above-described configuration, a timing information acquisition process, a playback process, and the like are performed.

The timing information acquisition process is performed by the timing information acquisition unit 20. In the timing information acquisition process, the timing information representing the timing of the utterance of keywords during the playback of contents is acquired.

The playback process is performed by the playback control unit 30. In the playback process, the digest playback or the like is performed using the timing information acquired in the timing information acquisition process.

Timing Information Acquisition Process

Figure 2:
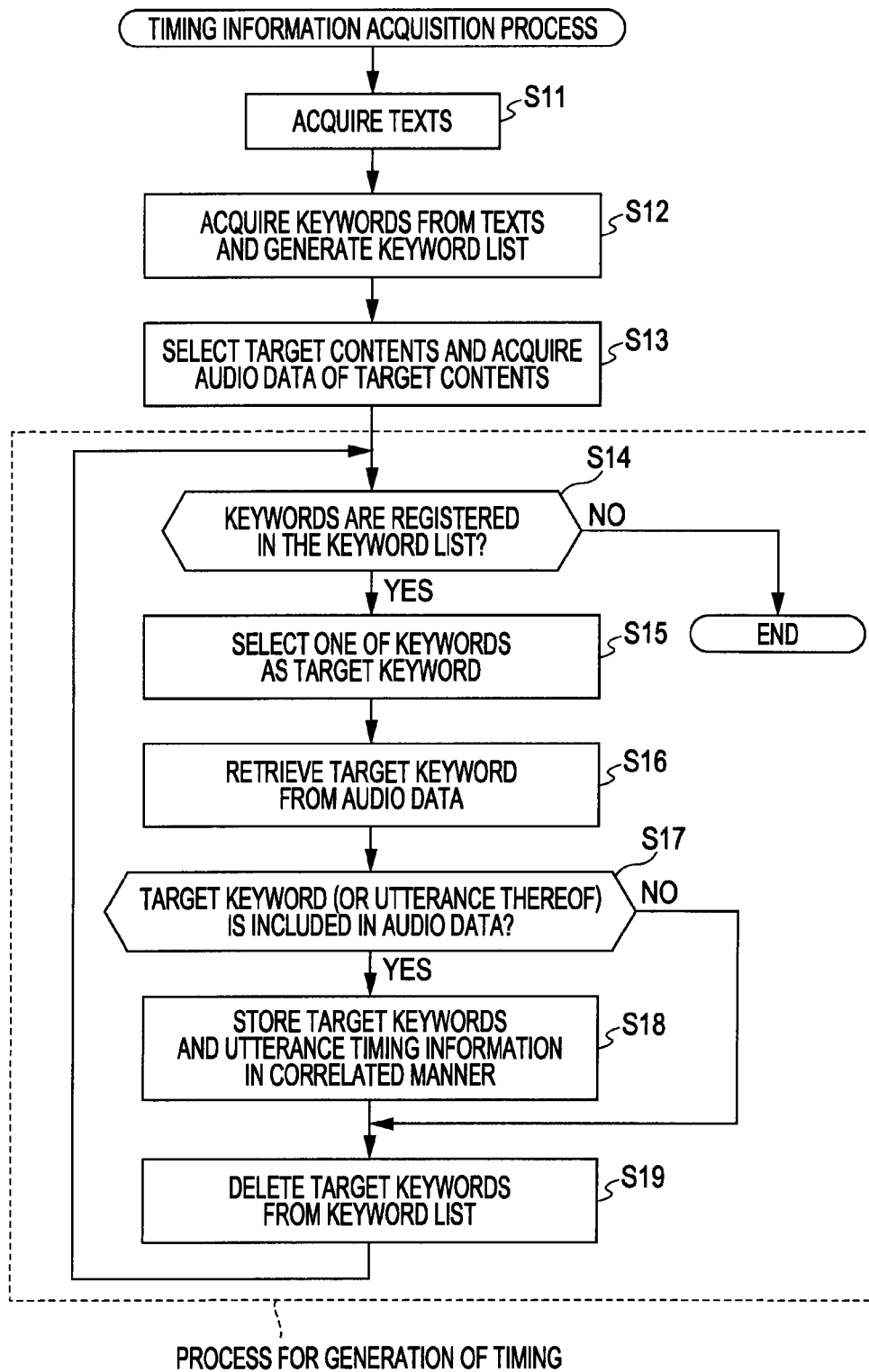
FIG. 2 is a flowchart illustrating a timing information acquisition process.

With reference now to FIG. 2, the timing information acquisition process performed by the timing information acquisition unit 20 of FIG. 1 will be described.

In the recorder of FIG. 1, it will be assumed that the contents data of one or more contents are recorded in the contents holding portion 12. Moreover, the timing information acquisition process is performed (started) at an arbitrary timing.

In the timing information acquisition process, at step S11, the text acquisition portion 21 acquires texts and supplies the texts to the keyword acquisition portion 22, and the process flow proceeds to step S12.

At step S12, the keyword acquisition portion 22 acquires keywords, which are character strings to be subject to audio retrieval, from the texts supplied from the text acquisition portion 21 and generates a keyword list in which one or more keywords are registered.

That is to say, the keyword acquisition portion 22 extracts one or more character strings to be used as targets of audio retrieval from the texts supplied from the text acquisition portion 21 and generates a keyword list in which each character string is registered as a keyword.

Then, the process flow proceeds from step S12 to step S13, where the audio data acquisition portion 23 selects, as target contents, one of the contents which are not selected as target contents, among the contents of which the contents data are recorded in the contents holding portion 12. Furthermore, at step S13, the audio data acquisition portion 23 acquires audio data of the contents data of the target contents from the contents holding portion 12 and supplies the audio data to the audio retrieval portion 24.

Then, the process flow proceeds from step S13 to step S14, and a timing information list generation process for generating a timing information list of the target contents is performed at steps S14 to S19.

Specifically, at step S14, the audio retrieval portion 24 determines whether or not keywords are registered in the keyword list supplied from the keyword acquisition portion 22.

When it is determined at step S14 that keywords are registered in the keyword list, the process flow proceeds to step S15, where the audio retrieval portion 24 selects one of the keywords registered in the keyword list as a target keyword, and then, the process flow proceeds to step S16.

At step S16, the audio retrieval portion 24 performs audio retrieval to retrieve an utterance of the target keyword from the audio data of the target contents supplied from the audio data acquisition portion 23, and the process flow proceeds to step S17.

Here, the audio retrieval of the utterance of the target keyword from the audio data may be performed using so-called keyword spotting, for example.

Furthermore, the audio retrieval may be performed using other methods, for example, a method (hereinafter also referred to as an index-based retrieval method) of generating the phonemes of the audio data supplied from the audio data acquisition portion 23 to the audio retrieval portion 24 and the index of the positions of the phonemes, thus finding a sequence of phonemes that form the target keyword from the index. The index-based retrieval method is described, for example, in N. Kanda, et al. "Open-Vocabulary Keyword Detection from Super-Large Scale Speech Database," IEEE Signal Processing Society 2008 International Workshop on Multimedia Signal Processing.

At step S17, the audio retrieval portion 24 determines, based on the results of the audio retrieval at step S16, whether or not the utterance of the target keyword (namely, audio data corresponding to the utterance of the target keyword) is included in the audio data of the target contents.

When it is determined at step S17 that the utterance of the target keyword was included in the audio data of the target contents, the audio retrieval portion 24 detects the timing of the utterance, and then, the process flow proceeds to step S18.

At step S18, the audio retrieval portion 24 registers (stores) the target keyword and the timing information representing the timing of the utterance of the target keyword in the timing information list of the target contents in a correlated manner, and the process flow proceeds to step S19.

On the other hand, when it is determined at step S17 that the utterance of the target keyword is not included in the audio data of the target contents, then, the process flow proceeds to step S19 while skipping step S18.

At step S19, the audio retrieval portion 24 deletes the target keyword from the keyword list, and the process flow then returns to step S14, and the same processes are repeated.

When it is determined at step S14 that keywords are not registered in the keyword list; that is to say, when the audio retrieval was performed for an entirety of the keywords registered in the keyword list generated at step S12, the audio retrieval portion 24 supplies the timing information list of the target contents to the timing information storage portion 25, and then, the process flow ends.

As described above, in the timing information acquisition process, the text acquisition portion 21 acquires texts and the keyword acquisition portion 22 acquires keywords from the texts. Then, the audio retrieval portion 24 retrieves the utterance of the keywords from the audio data of the target contents and acquires the timing information representing the timing of the utterance of the keyword of which the utterance is retrieved.

Therefore, it is possible to acquire the scenes in which keywords are uttered during the playback of contents; that is to say, it is possible to acquire the timings (the timing information representing the timings) of scenes in which keywords are descriptive of the details.

Playback Process

Figure 3:
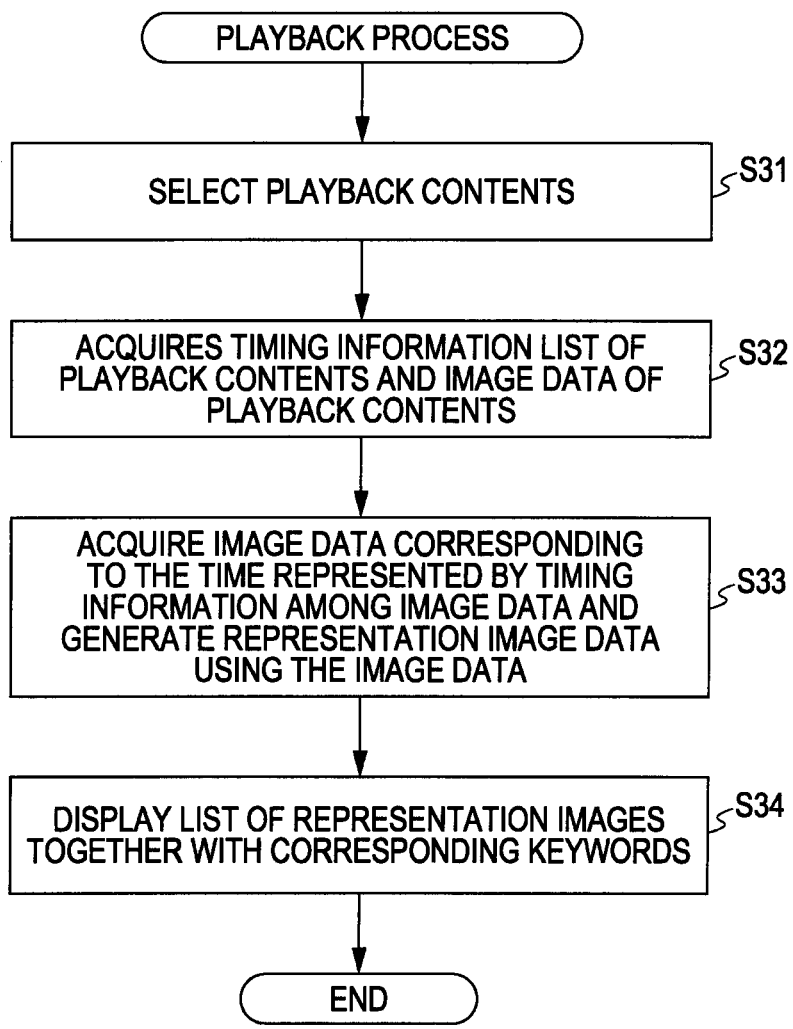
FIG. 3 is a flowchart illustrating a playback process.

With reference now to FIG. 3, the playback process performed by the playback control unit 30 of FIG. 1 will be described.

In the recorder of FIG. 1, it will be assumed that the timing information acquisition process of FIG. 2 has been performed, and the timing information storage portion 25 has stored therein the timing information list of an entirety of the contents of which the contents data are recorded in the contents holding portion 12.

For example, when a user operates a non-illustrated operation unit to designate contents to be used for digest playback among the contents of which the contents data are recorded in the contents holding portion 12, the representation image generation portion 31 selects at step S31 the contents designated by the user as playback contents, and the process flow then proceeds to step S32.

At step S32, the representation image generation portion 31 acquires image data of the playback contents from the contents holding portion 12 and also acquires the timing information list of the playback contents from the timing information storage portion 25, and then, the process flow proceeds to step S33.

At step S33, the representation image generation portion 31 acquires image data around the time represented by the timing information registered in the timing information list among the image data of the playback contents and generates representation image data from the image data.

Specifically, the representation image generation portion 31 generates, as the representation image data, thumbnail image data from image data of a frame (field) corresponding to the time represented by the timing information registered in the timing information list, for example.

The representation image generation portion 31 generates representation image data with respect to an entirety of the timing information registered in the timing information list and supplies the respective representation image data and keywords corresponding to the representation image data to the display control portion 32 in a paired manner: that is to say, the keywords correlated with the timing information are paired with the representation image data generated from image data around the time represented by the timing information.

Then, the process flow proceeds from step S33 to step S34, where the display control portion 32 displays a list of representation images corresponding to the representation image data supplied from the representation image generation portion 31 together with corresponding keywords on the display device 40, and the process flow ends.

In this way, on the display device 40, the representation images are displayed together with the keywords which are paired with the representation image data, the keywords being descriptive of the details of a scene including the representation images.

Therefore, the user is able to grasp easily the details of the scenes of the playback contents.

That is to say, even when the playback contents are of a news program in which the representation images are mainly composed of the image of a newscaster, the user is able to grasp easily the details of the scene including the representation image by reading the keywords being displayed together with the respective representation image.

When a list of representation images is displayed, the representation images are displayed sequentially based on the display time of the frames of image data used for generating the representation images.

Although in this example, the thumbnails of the frames corresponding to the time represented by the timing information are used as the representation images, the representation images may be short video clips (including those with a reduced size) including images corresponding to the time represented by the timing information, for example.

First Exemplary Configuration of Text Acquisition Portion 21

Figure 4:
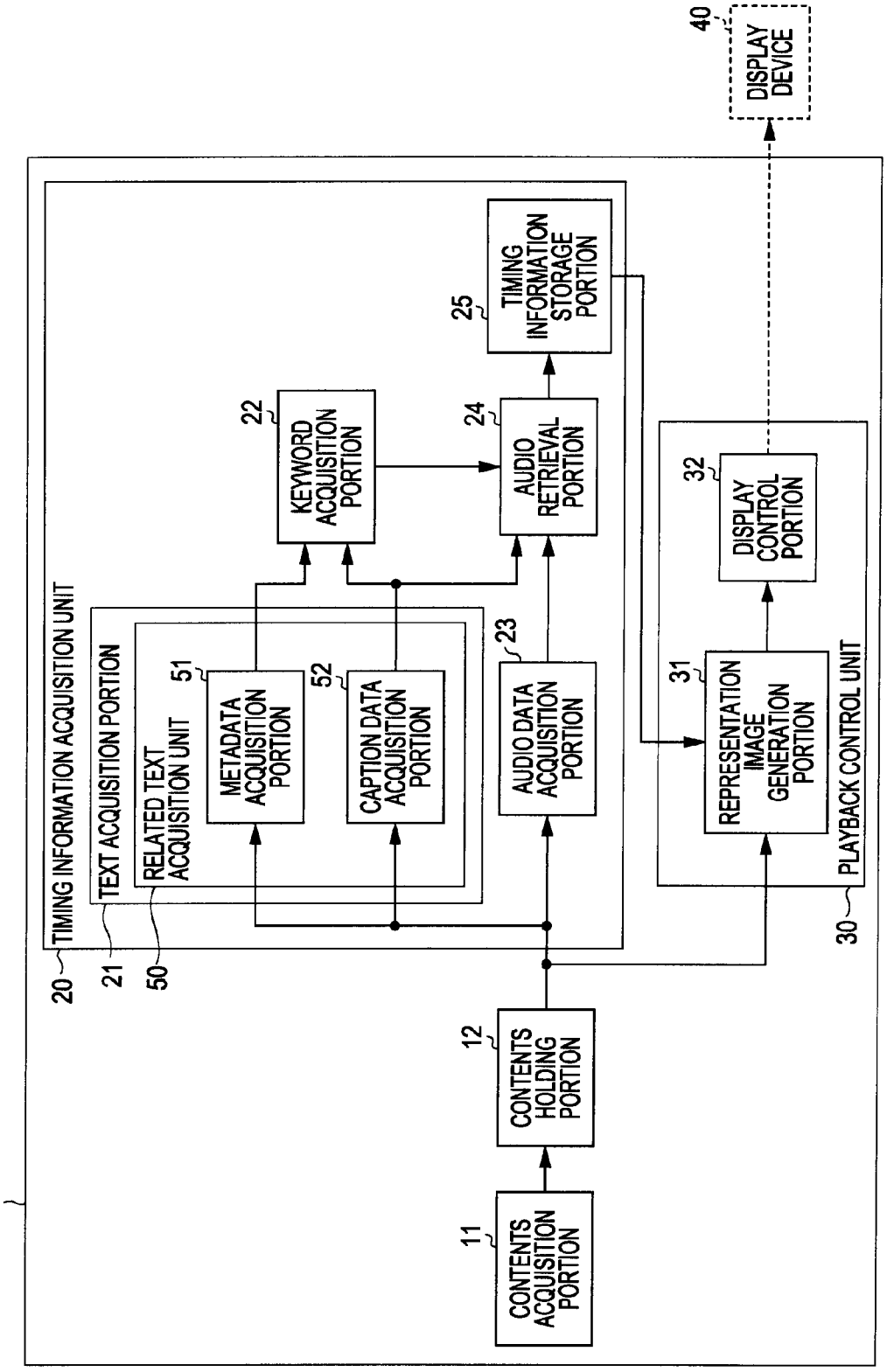
FIG. 4 is a block diagram illustrating a first exemplary configuration of a text acquisition portion.

With reference now to FIG. 4, a first exemplary configuration of the text acquisition portion 21 of FIG. 1 is illustrated.

In FIG. 4, the text acquisition portion 21 is configured as a related text acquisition unit 50.

The related text acquisition unit 50 is configured to acquire texts (hereinafter also referred to as related texts) that are related to the contents of which the contents data are recorded in the contents holding portion 12 and supply the texts to the keyword acquisition portion 22.

Specifically, in FIG. 4, the related text acquisition unit 50 includes a metadata acquisition portion 51 and a caption data acquisition portion 52.

When the metadata of the target contents are recorded in the contents holding portion 12, the metadata acquisition portion 51 acquires the metadata as the related texts by reading them out of the contents holding portion 12 and supplies the related texts to the keyword acquisition portion 22.

Specifically, when the target contents are television broadcast programs, for example, and the EPG data as the metadata of the television broadcast programs are recorded in the contents holding portion 12, the metadata acquisition portion 51 extracts related texts, such as titles of the programs as the target contents, actors' names, or brief summaries (outlines), from the EPG data and supplies the related texts to the keyword acquisition portion 22.

The metadata acquisition portion 51 may acquire the metadata of the target contents from websites on a network such as the Internet, in addition to acquiring the metadata which are recorded in the contents holding portion 12.

Specifically, the metadata acquisition portion 51 may acquire the metadata of the target contents from websites (webpages) providing information on programs, such as websites on the Internet providing iEPG or websites of broadcasting stations presenting the programs, for example.

When the contents data of the target contents includes caption data in addition to image data and audio data, the caption data acquisition portion 52 acquires the caption data as the related texts by reading them out of the contents holding portion 12 and supplies the related texts to the keyword acquisition portion 22.

The caption data acquisition portion 52 may acquire display time information representing the display time of a caption corresponding to the caption data from the contents holding portion 12, in addition to acquiring the caption data from the contents holding portion 12. Then, the caption data acquisition portion 52 supplies the display time information to the audio retrieval portion 24.

In this case, the audio retrieval portion 24 may perform the audio retrieval of the utterance of the keywords acquired from the caption data as the related texts with respect only to audio data around the display time represented by the display time information of the caption data. That is to say, the audio retrieval may be performed with respect only to audio data corresponding to a predetermined display time interval of the caption corresponding to the caption data, where the display time interval is extended by a predetermined period at the beginning and ending thereof.

By performing the audio retrieval of the utterance of keywords with respect only to the audio data around the display time represented by the display time information rather than an entirety of the audio data of the target contents, it is possible to improve the accuracy of the audio retrieval, reduce the amount of processing necessary for the retrieval, and accelerate the retrieval processing. As a result, the timing information acquisition process can be performed effectively.

When the caption is superimposed on the image of contents in the form of a telop (ticker) or the like, rather than being included in the contents data as the caption data, the caption data acquisition portion 52 may extract the telop by image processing and convert the telop into text caption data by character recognition so that the telop can be processed in the same manner as the case where the caption is included in the contents data as the caption data.

Processing Example According to First Exemplary Configuration of Text Acquisition Portion 21

Figure 5:
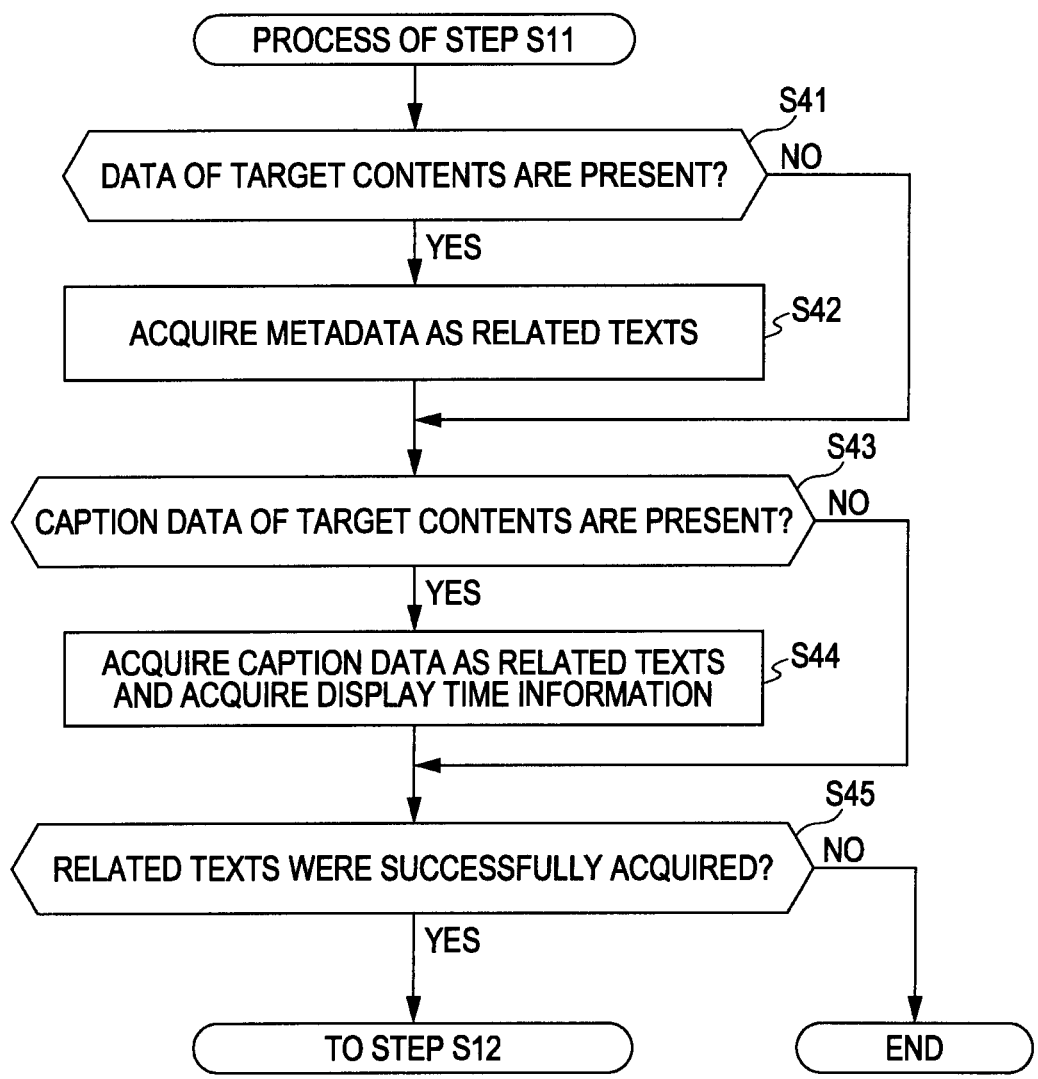
FIG. 5 is a flowchart illustrating a processing example according to the first exemplary configuration of the text acquisition portion.

With reference now to FIG. 5, the processing example according to the first exemplary configuration of the text acquisition portion 21 of FIG. 4 (that is, the process of step S11 in the timing information acquisition process of FIG. 2) will be described.

At step S41, the metadata acquisition portion 51 determines whether or not the metadata of the target contents are present in the contents holding portion 12 or on the Internet websites.

When it is determined at step S41 that the metadata of the target contents are present in the contents holding portion 12 or on the Internet websites, the process flow proceeds to step S42, where the metadata acquisition portion 51 acquires the metadata of the target contents from the contents holding portion 12 or the Internet websites as the related texts. Moreover, the metadata acquisition portion 51 supplies the metadata as the related texts to the keyword acquisition portion 22, and the process flow proceeds from step S42 to step S43.

When it is determined at step S41 that the metadata of the target contents are not present in the contents holding portion 12 or on the Internet websites, the process flow then proceeds to step S43 while skipping step S42.

At step S43, the caption data acquisition portion 52 determines whether or not the caption data of the target contents are present in the contents holding portion 12.

When it is determined at step S43 that the caption data of the target contents are present in the contents holding portion 12, the process flow proceeds to step S44, where the caption data acquisition portion 52 acquires the caption data of the target contents from the contents holding portion 12 as the related texts and also acquires the display time information of the caption data. Then, the caption data acquisition portion 52 supplies the caption data as the related texts to the keyword acquisition portion 22 and supplies the display time information to the audio retrieval portion 24, and the process flow then proceeds from step S44 to step S45.

At step S45, the keyword acquisition portion 22 determines whether or not the related texts have been supplied from at least one of the metadata acquisition portion 51 and the caption data acquisition portion 52.

When it is determined at step S45 that the keyword acquisition portion 22 has not received the related texts from any one of the metadata acquisition portion 51 and the caption data acquisition portion 52, the timing information acquisition process ends because in such a case, it is unable to acquire keywords.

When it is determined at step S45 that the keyword acquisition portion 22 has received the related texts from at least one of the metadata acquisition portion 51 and the caption data acquisition portion 52, then, the process flow proceeds to step S12 of FIG. 2, and the above-described processes are performed.

Representation Example of Representation Image

Figure 6:
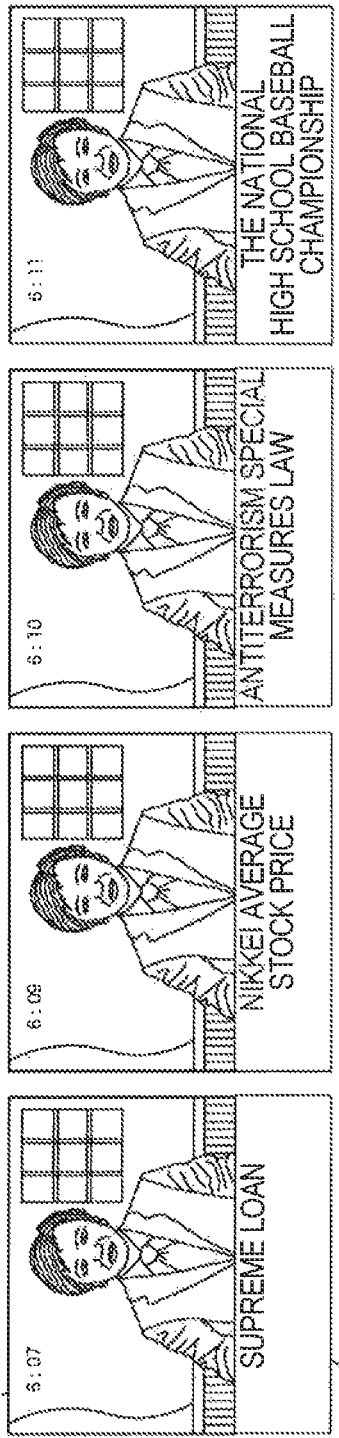
FIG. 6 is a diagram illustrating a representation example of a representation image.

With reference now to FIG. 6, representation examples of the representation image which is displayed by the playback process of FIG. 3 are illustrated.

Specifically, FIG. 6 illustrates the representation examples of representation images in which the timing information acquisition process described in FIGS. 2 and 5 is performed with a news program as the contents being used as target contents, and the news program is selected as the playback contents in the playback process of FIG. 3.

Referring to FIG. 6, four thumbnail images of a newscaster of the news program as the playback contents are displayed as the representation images sequentially from the left in the order of display time.

All of the four thumbnails in FIG. 6 show the newscaster; it is difficult to grasp the details of the news program only by watching the thumbnails.

However, in FIG. 6, keywords corresponding to the representation images as thumbnails are displayed together with the respective thumbnails.

Specifically, in FIG. 6, among the four thumbnail images of the newscaster, a keyword "Subprime Lone" is displayed on the lower part of the first thumbnail (from the left), and a keyword "Nikkei Average Stock Price" is displayed on the lower part of the second thumbnail. Moreover, a keyword "Antiterrorism Special Measures Law" is displayed on the lower part of the third thumbnail, and a keyword "The National High School Baseball Championship" is displayed on the lower part of the fourth thumbnail.

Therefore, the user is able to grasp easily the details of the news program by reading the keywords.

Here, when the contents are divided into several scenes, the keywords can be said to function as titles of the scenes.

Although in FIG. 6, the thumbnails of images corresponding to the time at which the keywords are uttered are displayed as the representation image, thumbnails of the other images of the contents may be displayed as the representation image.

Specifically, images around the time at which the keywords are uttered among the images of the contents may be used as candidates (hereinafter also referred to as thumbnail candidate images) for images to be converted into thumbnails, and the thumbnails of the thumbnail candidate images may be displayed as the representation images rather than displaying the thumbnails of the images corresponding to the time at which the keywords are uttered.

Here, as the thumbnail candidate images, the opening images of scenes when contents are divided based on the characteristic amount of images or voices, for example, among the images around the time at which the keywords are uttered, may be used. Moreover, as the thumbnail candidate images, images of which the characteristic amount of images or voices is greatly different from that of the surrounding images, for example, among the images around the time at which the keywords are uttered, may be used.

That is to say, the thumbnails of the thumbnail candidate images which are images other than the images corresponding to the time at which the keywords are uttered are allowed to be displayed as the representation images. Therefore, there is a high possibility that thumbnails of images (of various scenes) are displayed as the representation images, rather than that the thumbnails of such images of similar scenes as the images of the newscaster illustrated in FIG. 6 are displayed as the representation images.

Figure 7:
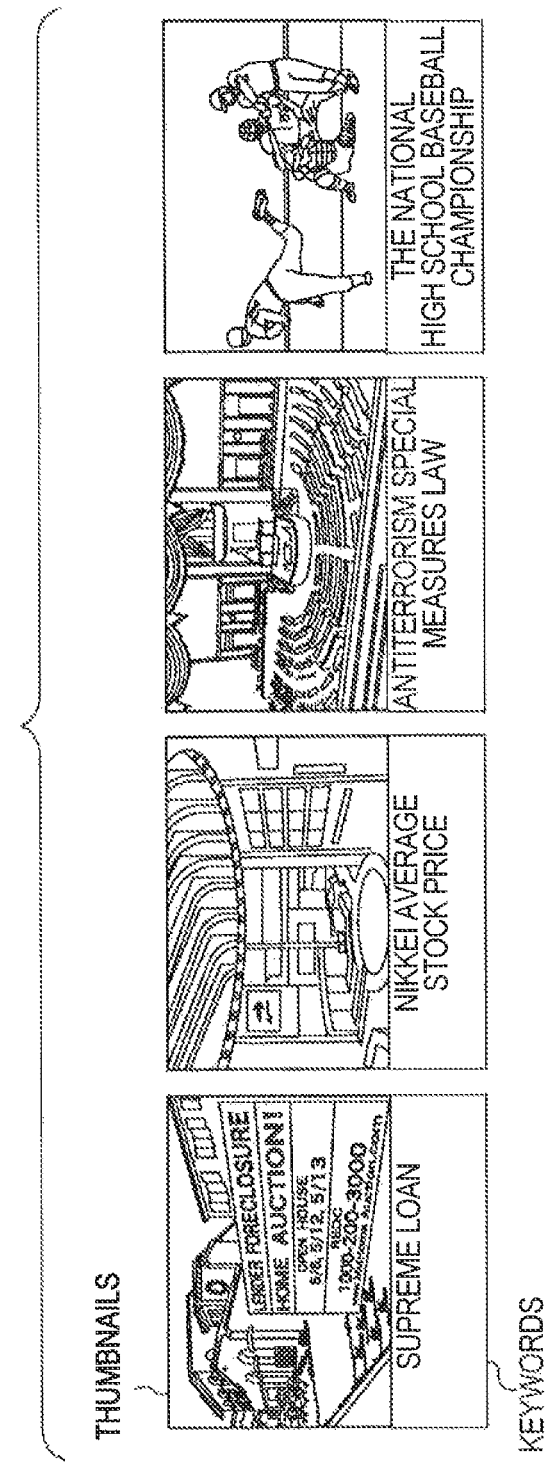
FIG. 7 is a diagram illustrating a representation example of the representation image.

With reference now to FIG. 7, representation examples of the representation image are illustrated in which various thumbnail images are displayed as the representation images.

In FIG. 7, in place of the images corresponding to the time at which the keywords are uttered, the thumbnails of the thumbnail candidate images around the time are displayed as the four representation images together with the keywords illustrated in FIG. 6.

Specifically, in FIG. 7, the first thumbnail of the thumbnail candidate image shows a house which is put up for auction due to the subprime loan crisis, for example, and is displayed together with the keyword "Subprime Loan Crisis".

The second thumbnail of the thumbnail candidate image shows the Market Center in the TSE (Tokyo Stock Exchange) Arrows, for example, and is displayed together with the keyword "Nikkei Average Stock Price."

The third thumbnail of the thumbnail candidate image shows the inside view of The National Diet of Japan, for example, and is displayed together with the keyword "Antiterrorism Special Measures Law."

The fourth thumbnail of the thumbnail candidate image shows a scene of a high school baseball match, for example, and is displayed together with the keyword "The National High School Baseball Championship."

The representation images of FIG. 7 enable users to grasp better the details of the contents than the representation images of FIG. 6.

However, in the case of the third thumbnail of the thumbnail candidate image showing the interior view of The National Diet of Japan, although it is possible to grasp roughly that the contents are about political issues, it is difficult to grasp further details thereof.

However, from the keyword "Antiterrorism Special Measures Law" being displayed together with the thumbnail, it is possible to grasp easily that the contents are about the antiterrorism special measures law.

Referring to FIGS. 6 and 7, although the keywords are displayed on the lower parts of the representation images, the positions at which the keywords are displayed are not particularly limited. Moreover, the keywords may be displayed to be superimposed on a part of the representation images.

According to the above-described technique disclosed in Japanese Unexamined Patent Application Publication No. 2008-124551, since the playback periods of the voices of a dialogue are extracted, it is possible to perform digest playback in which images corresponding to the playback periods are sequentially played back. However, a list of thumbnails as the representation images is not displayed.

Moreover, even when the technique disclosed in Japanese Unexamined Patent Application Publication No. 2008/124551 is modified to display the thumbnails of the opening images corresponding to the playback periods of the voices of the dialog, the keywords are not displayed as illustrated in FIGS. 6 and 7. Therefore, when the thumbnails of similar images are displayed, it will be difficult to grasp the details of the contents.

Second Exemplary Configuration of Text Acquisition Portion 21.

Figure 8:
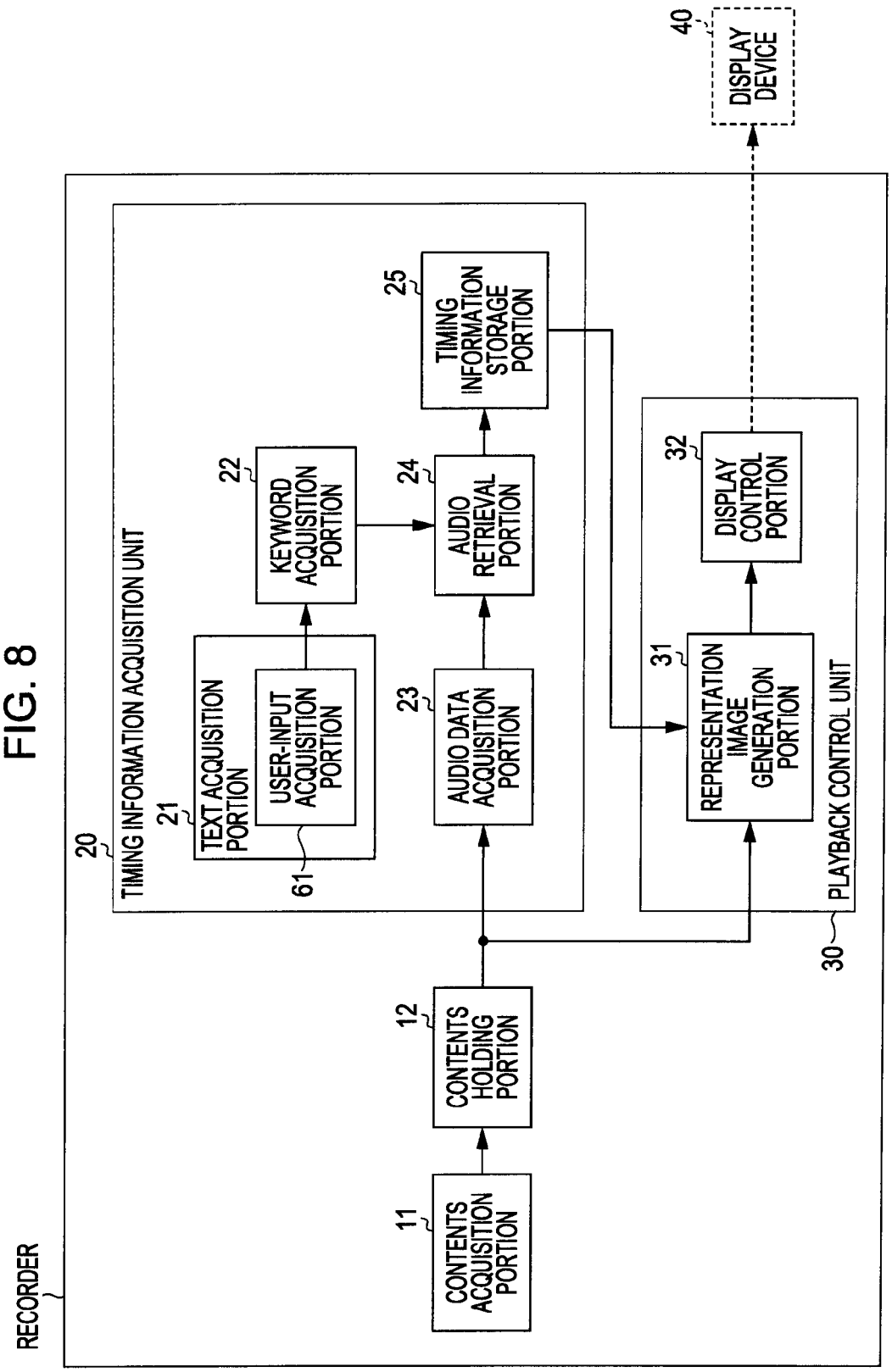
FIG. 8 is a block diagram illustrating a second exemplary configuration of the text acquisition portion.

With reference now to FIG. 8, a second exemplary configuration of the text acquisition portion 21 of FIG. 1 is illustrated.

In FIG. 8, the text acquisition portion 21 is configured as a user-input acquisition portion 61.

The user-input acquisition portion 61 is configured to acquire inputs from a user as texts and supply the texts to the keyword acquisition portion 22.

That is to say, the user-input acquisition portion 61 acquires inputs of character strings, which are supplied from a non-illustrated keyboard when a user operates the keyboard, for example, as the texts. Moreover, the user-input acquisition portion 61 performs speech recognition on inputs of utterance (speech) of a user to acquire character strings obtained as the results of the speech recognition as the texts.

Processing Example of Second Exemplary Configuration of Text Acquisition Portion 21.

Figure 9:
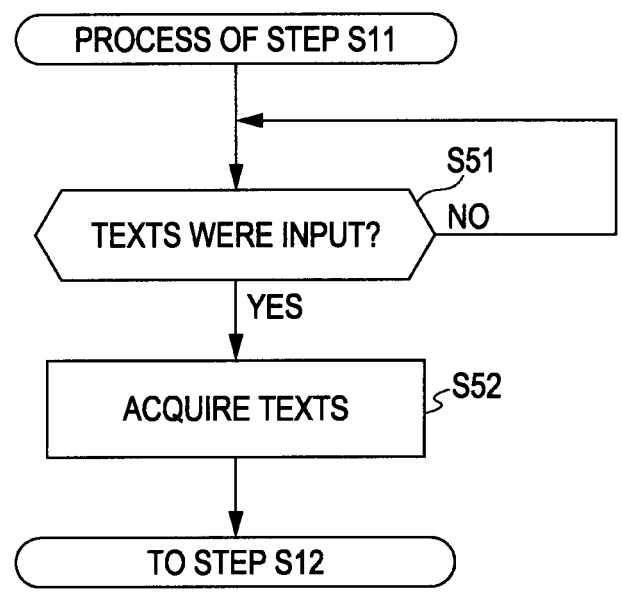
FIG. 9 is a flowchart illustrating a processing example according to the second exemplary configuration of the text acquisition portion.

With reference now to FIG. 9, the processing example according to the second exemplary configuration of the text acquisition portion 21 of FIG. 8 (that is, the process of step S11 in the timing information acquisition process of FIG. 2) will be described.

At step S51, the user-input acquisition portion 61 determines whether or not texts were input in response to the user operating a keyboard or uttering words. When it is determined at step S51 that the texts were not input, then, the process flow returns to step S51.

When it is determined at step S51 that the texts were input, then, the process flow proceeds to step S52, where the user-input acquisition portion 61 acquires the texts and supplies them to the keyword acquisition portion 22. Then, the process flow proceeds to step S12 of FIG. 2, and the above-described processes are performed.

Here, the keyword acquisition portion 22 may acquire an entirety of the texts supplied from the text acquisition portion 21 as one keyword as described above in FIG. 1.

When the keyword acquisition portion 22 acquires an entirety of the texts supplied from the text acquisition portion 21 as one keyword, the texts themselves input by the user are used as the keywords. Therefore, it can be said that the user is able to input the keywords.

Specific Content Retrieval Process

When the inputs from a user are acquired as texts, and keywords are acquired from the texts (including the case where the texts themselves input from the user are used as the keywords), in addition to the timing information acquisition process described in FIG. 2, where the timing information list is generated in which the keywords and the timing information of the keywords are registered in a correlated manner, a specific content retrieval process may be performed so as to retrieve contents containing utterance of keywords acquired from the inputs from the user.

Figure 10:
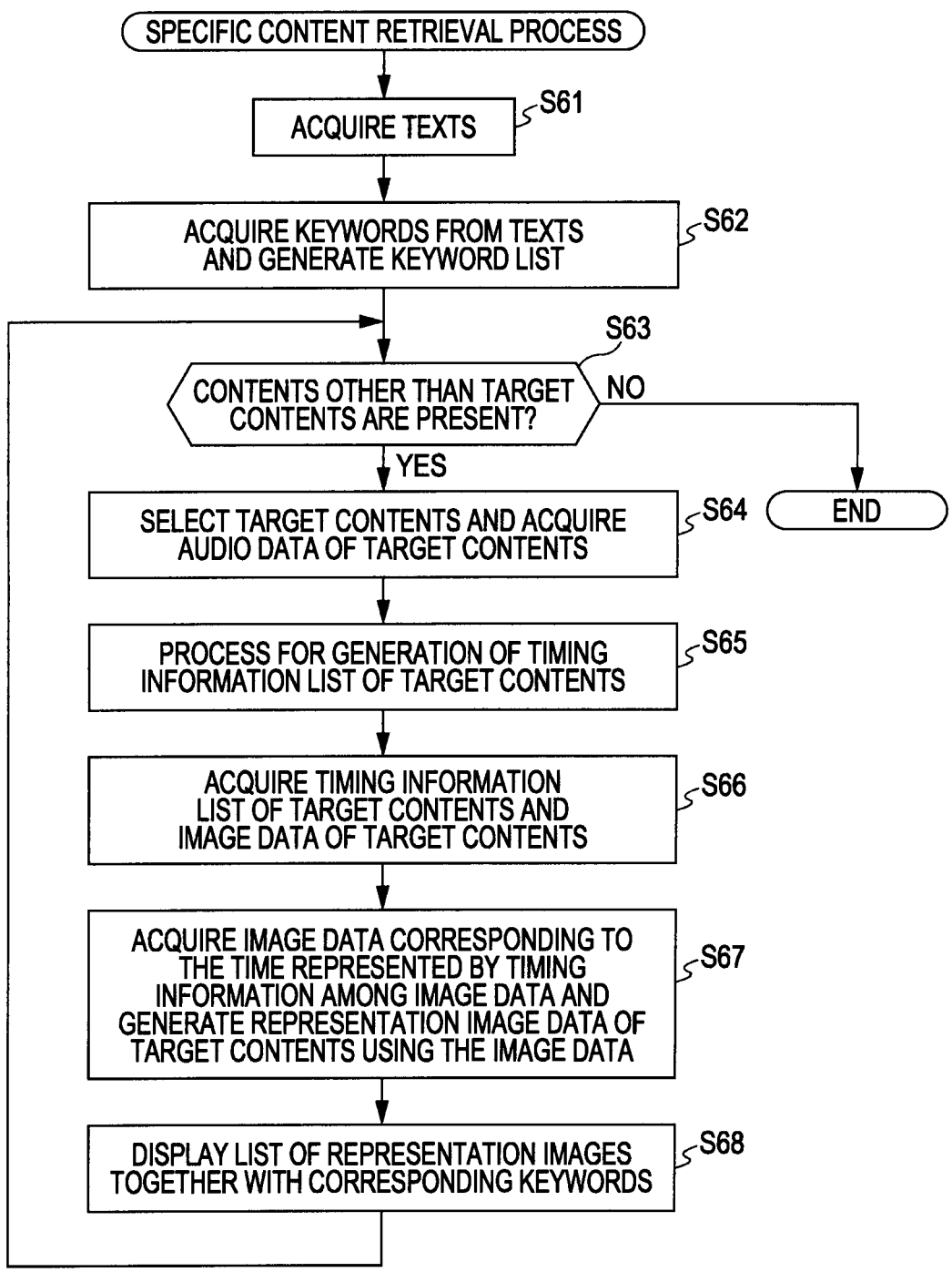
FIG. 10 is a flowchart illustrating a specific content retrieval process.

With reference now to FIG. 10, a specific content retrieval process which can be performed by the recorder of FIG. 1 will be described.

The specific content retrieval process can be performed by using the timing information acquisition process of FIG. 2 and the playback process of FIG. 3.

That is to say, in the specific content retrieval process, at step S61, the text acquisition portion 21 acquires texts in the same manner as described in FIG. 9 and supplies the texts to the keyword acquisition portion 22.

Specifically, when a user inputs the names of actors that the user is interested in, or words representing a genre, the text acquisition portion 21 (specifically, the user-input acquisition portion 61 of FIG. 8) acquires the user's inputs as texts and supplies the texts to the keyword acquisition portion 22.

Then, the process flow proceeds from step S61 to step S62, where the keyword acquisition portion 22 acquires keywords from the texts supplied from the text acquisition portion 21 and generates a keyword list registering the keywords therein in the same manner as step S12 of FIG. 2. Then, the keyword acquisition portion 22 supplies the keyword list to the audio retrieval portion 24, and the process flow proceeds from step S62 to step S63.

In this case, in the keyword list, the names of actors that the user is interested in, or the words representing a genre are registered as keywords.

At step S63, the audio data acquisition portion 23 determines whether or not contents which are not selected as target contents remain in the contents of which the contents data are recorded in the contents holding portion 12.

When it is determined at step S63 that the contents which are not selected as target contents remain in the contents of which the contents data are recorded in the contents holding portion 12, then, the process flow proceeds to step S64, where the audio data acquisition portion 23 selects, as target contents, one of the contents which are not selected as target contents, among the contents of which the contents data are recorded in the contents holding portion 12.

Furthermore, at step S64, the audio data acquisition portion 23 acquires audio data of the contents data of the target contents from the contents holding portion 12 and supplies the audio data to the audio retrieval portion 24.

Then, the process flow proceeds from step S64 to step S65, where the audio retrieval portion 24 performs the timing information list generation process for generating a timing information list of the target contents; that is to say, the same processes as steps S14 to S19 of FIG. 2 are performed.

At step S65, the timing information list generation process is performed whereby the timing information list of the target contents is generated and stored in the timing information storage portion 25. Then, the process flow proceeds to step S66, and at steps S66 to S68, the playback control unit 30 performs the same processes as the respective steps S32 to S34 in the playback process of FIG. 3 while using the target contents as the playback contents.

Specifically, at step S66, the representation image generation portion 31 of the playback control unit 30 acquires image data of the target contents from the contents holding portion 12 and also acquires the timing information list of the target contents from the timing information storage portion 25, and then, the process flow proceeds to step S67.

At step S67, the representation image generation portion 31 acquires image data around the time represented by the timing information registered in the timing information list among the image data of the target contents and generates representation image data from the image data.

Specifically, the representation image generation portion 31 generates, as the representation image data, thumbnail image data from image data of a frame corresponding to the time represented by the timing information registered in the timing information list, for example.

The representation image generation portion 31 generates representation image data with respect to an entirety of the timing information registered in the timing information list and supplies the respective representation image data and keywords corresponding to the representation image data to the display control portion 32 in a paired manner.

Then, the process flow proceeds from step S67 to step S68, where the display control portion 32 displays a list of representation images corresponding to the representation image data supplied from the representation image generation portion 31 together with corresponding keywords on the display device 40.

In this way, on the display device 40, the representation images are displayed together with the keywords which are paired with the representation image data, the keywords being descriptive of the details of a scene (consecutive frames) including the representation images.

Then, the process flow returns to step S63 from step S68, and the same processes are repeated.

When it is determined at step S63 that the contents which are not selected as target contents do not remain in the contents of which the contents data are recorded in the contents holding portion 12; that is to say, when the processes of steps S63 to S68 are performed using an entirety of the contents of which the contents data are recorded in the contents holding portion 12 as the target contents, then, the process flow ends.

In this case, the names of actors that the user is interested in, or the words representing a genre are used as keywords.

Therefore, the target contents contain many utterances of the names of actors that the user is interested in, or the words representing a genre, and a number of thumbnails are displayed together with the keywords.

On the other hand, when the target contents contain few utterances of the names of actors that the user is interested in, or the words representing a genre; that is to say, in an extreme case where the target contents contain no utterance of the names of actors that the user is interested in, or the words representing a genre, thumbnails are not displayed as the representation images.

Therefore, the user is able to grasp easily that the contents for which a number of thumbnails are displayed together with keywords are contents related to the actors that the user is interested in or contents related to the genres that the user is interested in.

In the specific content retrieval process of FIG. 10, it is necessary to perform the timing information list generation process of step S65 (corresponding to steps S14 to S19 of FIG. 2) while using an entirety of the contents of which the contents data are recorded in the contents holding portion 12 as the target contents rather than using the contents designated by the user.

Therefore, it is particularly desirable to accelerate the audio retrieval for retrieving the utterance of keywords from the audio data among the timing information list generation process.

As method of accelerating the audio retrieval, the above-described index-based retrieval method can be used, for example, in which the phonemes of audio data and the index of the positions of the phonemes are generated, thus finding a sequence of phonemes that form the target keyword from the index.

Therefore, when the specific content retrieval process of FIG. 10 is performed, it is particularly desirable to configure the audio retrieval portion 24 of FIG. 1 so as to perform the audio retrieval using the index-based retrieval method.

Figure 11:
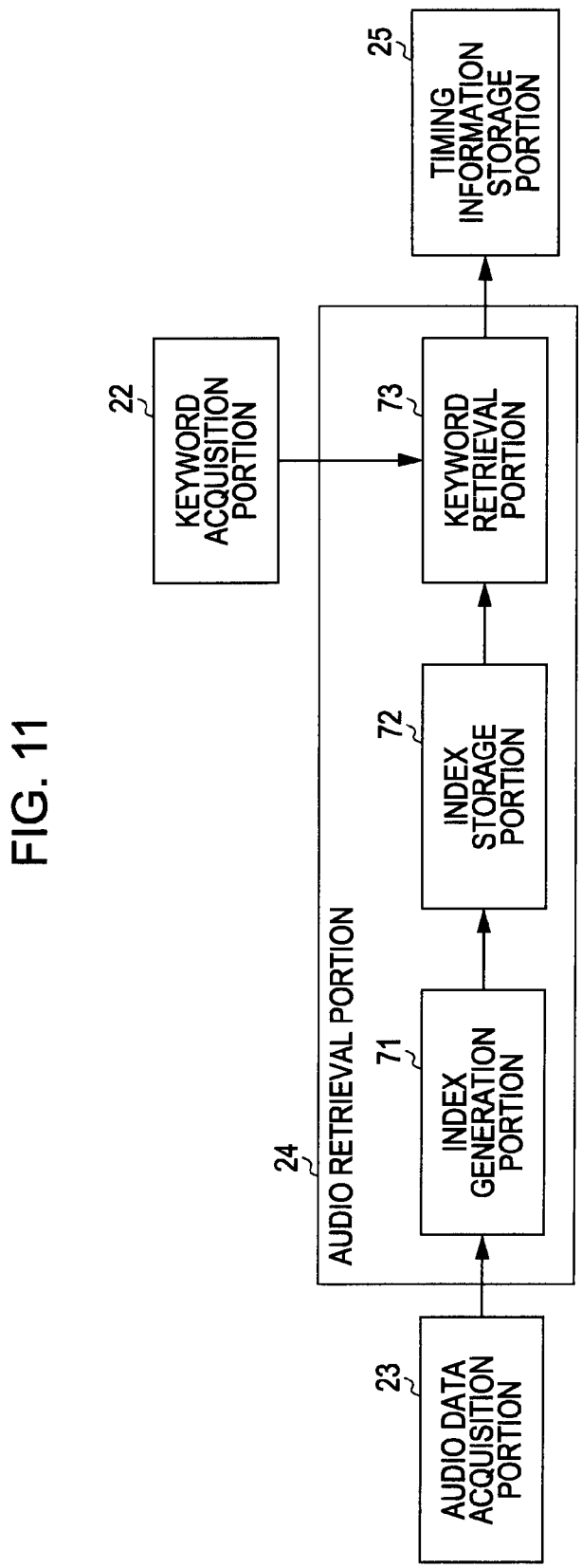
FIG. 11 is a block diagram illustrating an exemplary configuration of an audio retrieval portion.

Exemplary Configuration of Audio Retrieval Portion 24 Performing Audio Retrieval Using Index-Based Retrieval Method With reference now to FIG. 11, an exemplary configuration of the audio retrieval portion 24 performing audio retrieval using an index-based retrieval method is illustrated.

Referring to FIG. 11, the audio retrieval portion 24 includes an index generation portion 71, an index storage portion 72, and a keyword retrieval portion 73.

The index generation portion 71 is configured to receive the audio data of the target contents from the audio data acquisition portion 23.

The index generation portion 71 generates phonemes (phoneme string) in the audio data of the target contents supplied from the audio data acquisition portion 23 and the index of the positions (timings) of the phonemes and supplies the phonemes and the index to the index storage portion 72.

The index storage portion 72 is configured to temporarily store the index supplied from the index generation portion 71.

The keyword retrieval portion 73 is configured to receive the keywords from the keyword acquisition portion 22.

The keyword retrieval portion 73 retrieves a sequence of phonemes that form the keywords supplied from the keyword acquisition portion 22 from the index stored in the index storage portion 72.

When it was possible to retrieve the sequence of phonemes of the keyword from the index stored in the index storage portion 72, the keyword retrieval portion 73 acquires the timing information representing the timing (the position of the sequence of phonemes) from the index stored in the index storage portion 72 by determining that it was possible to retrieve the utterance of the keyword. Then, the keyword retrieval portion 73 generates a timing information list in which the keywords and the timing information are registered in a correlated manner and supplies the timing information list to the timing information storage portion 25.

Processing Example of Audio Retrieval Portion 24 Performing Audio Retrieval Using Index-Based Retrieval Method When the audio retrieval portion 24 is configured as illustrated in FIG. 11 so as to perform the audio retrieval using the index-based retrieval method, the audio retrieval portion 24 performs an index generation process for generating an index at step S64 in FIG. 10 prior to the timing information list generation process of step S65 upon receiving the audio data of the target contents from the audio data acquisition portion 23.

Figure 12:
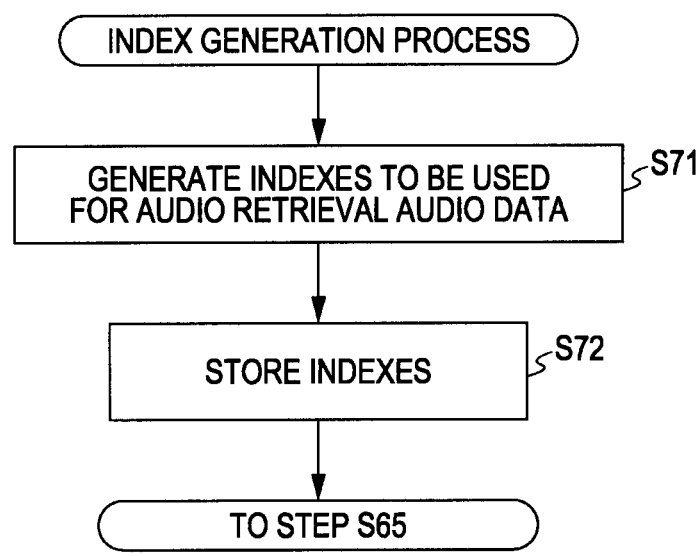
FIG. 12 is a flowchart illustrating an index generation process performed by the audio retrieval portion.

With reference now to FIG. 12, the index generation process performed by the audio retrieval portion 24 of FIG. 11 will be described.

At step S71, the index generation portion 71 generates phonemes in the audio data of the target contents supplied from the audio data acquisition portion 23 and the index of the positions of the phonemes and supplies the phonemes and the index to the index storage portion 72, and then, the process flow proceeds to step S72.

At step S72, the index storage portion 72 temporarily stores the index supplied from the index generation portion 71, and the process flow ends.

After the index generation process is completed, the timing information list generation process of step S65 in FIG. 10 is performed. Specifically, the keyword retrieval portion 73 performs audio-based keyword retrieval (corresponding to step S16 of FIG. 2) for retrieving the sequence of phonemes that form the keyword supplied from the keyword acquisition portion 22, from the index stored in the index storage portion 72.

First Exemplary Configuration of Representation Image Generation Portion 31

Figure 13:
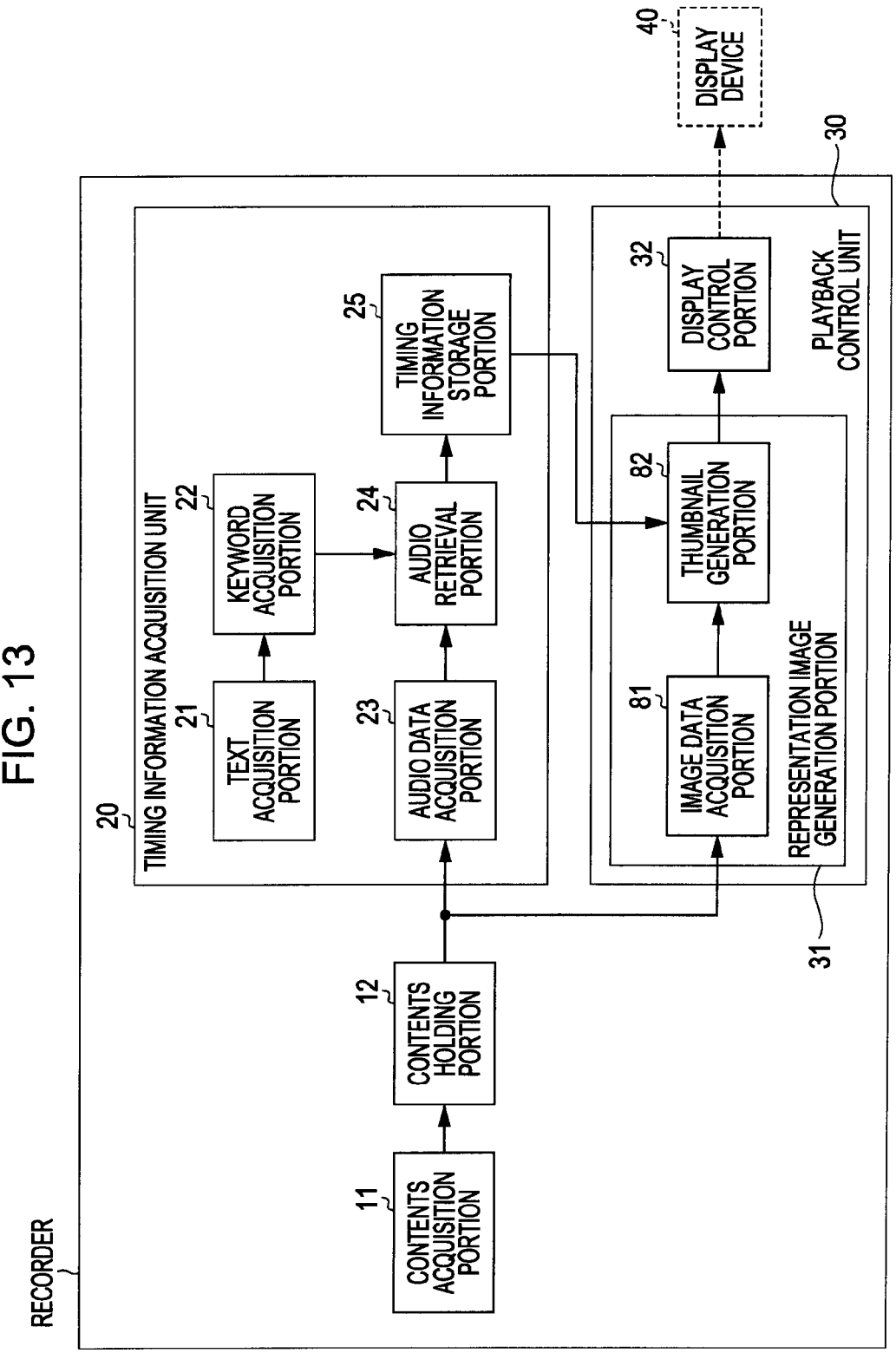
FIG. 13 is a block diagram illustrating a first exemplary configuration of a representation image generation portion.

With reference now to FIG. 13, a first exemplary configuration of the representation image generation portion 31 of FIG. 1 is illustrated.

Referring to FIG. 13, the representation image generation portion 31 includes an image data acquisition portion 81 and a thumbnail generation portion 82.

The image data acquisition portion 81 is configured to acquire image data of the target contents (or the playback contents) from the contents holding portion 12 and supply the image data to the thumbnail generation portion 82.

The thumbnail generation portion 82 is configured to receive the timing information list of the target contents (or the playback contents) from the timing information storage portion 25 in addition to receiving the image data of the target contents from the image data acquisition portion 81.

Based on the timing information registered in the timing information list supplied from the timing information storage portion 25, the thumbnail generation portion 82 generates thumbnail image data from the image data corresponding to the time represented by the timing information among the image data supplied from the image data acquisition portion 81 as representation image data.

Then, the thumbnail generation portion 82 supplies the keywords correlated with the timing information and the thumbnail image data as the representation image data generated based on the timing information to the display control portion 32 in a paired manner.

Processing Example of First Exemplary Configuration of Representation Image Generation Portion 31

Figure 14:
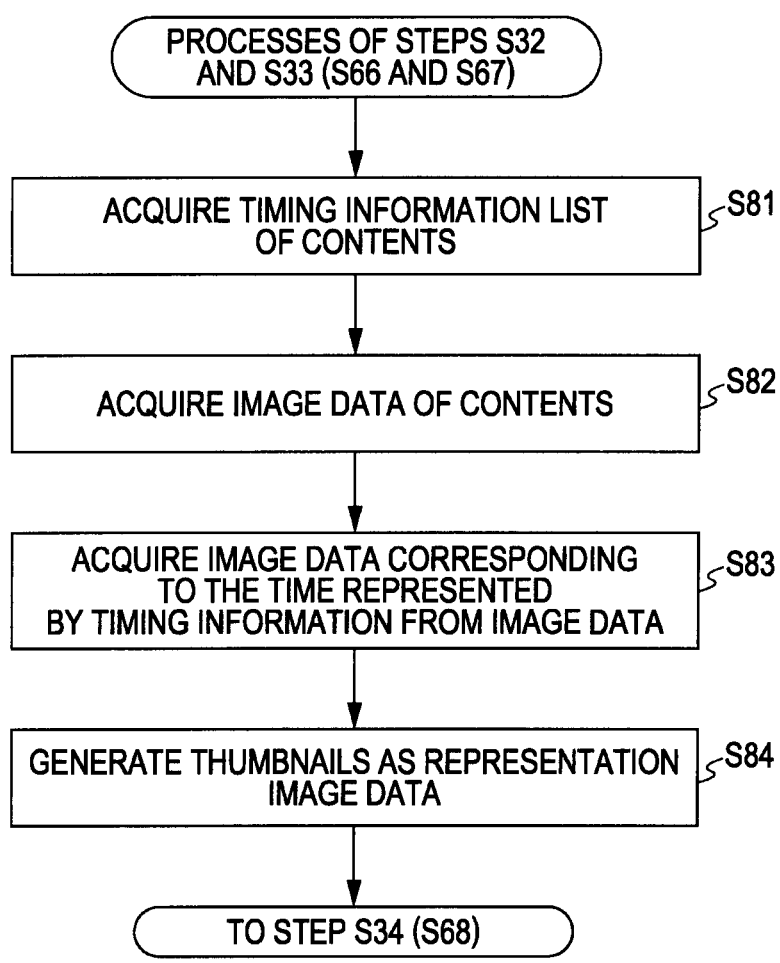
FIG. 14 is a flowchart illustrating a processing example according to the first exemplary configuration of the representation image generation portion.

With reference now to FIG. 14, the processing example of the first exemplary configuration of the representation image generation portion 31 of FIG. 13 (that is, the processes of steps S32 and S33 in the playback process of FIG. 3) will be described.

The same processes are performed at steps S66 and S67 of FIG. 10.

Specifically, at step S81, the thumbnail generation portion 82 acquires the timing information list of the playback contents from the timing information storage portion 25, and the process flow proceeds to step S82.

At step S82, the image data acquisition portion 81 acquires the image data of the playback contents from the contents holding portion 12 and supplies the image data to the thumbnail generation portion 82, and then, the process flow proceeds to step S83.

Here, the above-described processes of steps S81 and S82 are performed at step S32 of FIG. 3 (step S66 of FIG. 10). Moreover, the later-described processes of steps S83 and S84 are performed at step S33 of FIG. 3 (step S67 of FIG. 10).

Specifically, at step S83, based on the timing information registered in the timing information list supplied from the timing information storage portion 25, the thumbnail generation portion 82 acquires image data corresponding to the time represented by the timing information among the image data supplied from the image data acquisition portion 81.

Then, the process flow proceeds from step S83 to step S84, where the thumbnail generation portion 82 generates thumbnail image data from the image data corresponding to the time represented by the timing information as the representation image data.

At step S84, the thumbnail generation portion 82 supplies the keywords correlated with the timing information in the timing information list and the thumbnail image data as the representation image data generated based on the timing information to the display control portion 32 in a paired manner, and then, the process flow proceeds to step S34 of FIG. 3 (step S68 of FIG. 10).

Second Exemplary Configuration of Representation Image Generation Portion 31

As described above, the audio retrieval portion 24 performs the audio retrieval of retrieving the utterance of the target keyword supplied from the keyword acquisition portion 22, from the audio data of the target contents supplied from the audio data acquisition portion 23 and acquires the timing information of the target keyword of which the utterance is retrieved.

That is to say, when the utterance of the target keyword is retrieved from the audio data of the target contents, the audio retrieval portion 24 acquires the timing information of the target keyword of which the utterance is retrieved.

Therefore, when a plurality of times of utterance of the target keyword occurs in the target contents, the audio retrieval portion 24 acquires the timing information of the target keyword with respect to the plurality of times of utterance.

As described above, when the timing information of the target keyword is acquired with respect to the plurality of times of utterance; that is to say, when a plurality of pieces of timing information is acquired with respect to the target keyword, the target keyword and the plurality of pieces of timing information are registered in the timing information list in a correlated manner.

Moreover, when the keywords and the plurality of pieces of timing information are registered in the timing information list in a correlated manner, a plurality of representation images generated from the image data corresponding to the time represented by each of the plurality of pieces of timing information is displayed together with the same keyword in the playback process of FIG. 3.

However, from the perspective of attracting the user's attention, it is desirable that the plurality of representation images being displayed together with the keywords registered in the timing information list are composed of images which differ as much as possible, rather than being similar to each other such as similar images of a newscaster.

Figure 15:
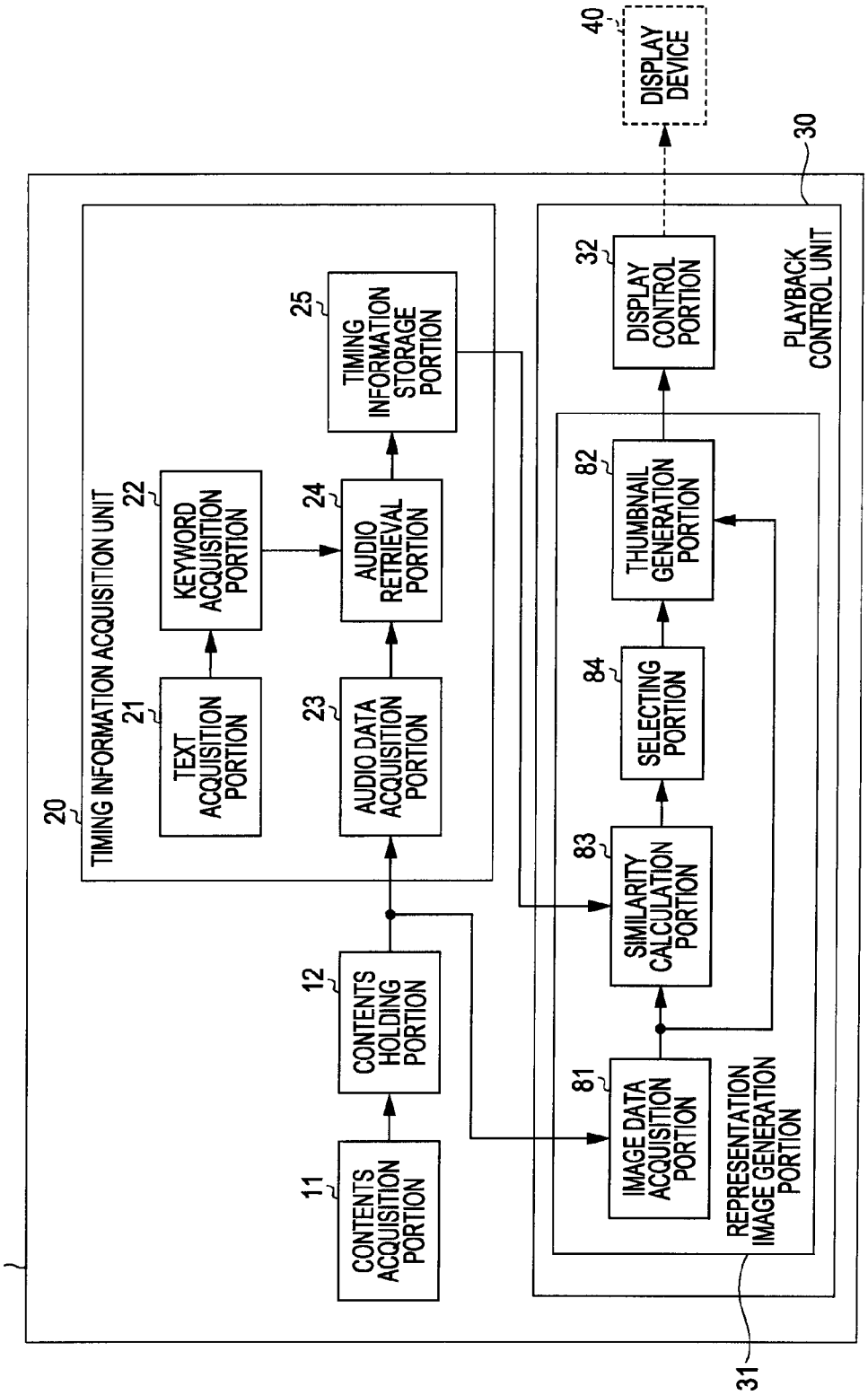
FIG. 15 is a block diagram illustrating a second exemplary configuration of the representation image generation portion.

With reference now to FIG. 15, a second exemplary configuration of the representation image generation portion 31 of FIG. 1 is illustrated.

In the drawing, the same or similar portions or units as those illustrated in FIG. 13 will be denoted by the same reference numerals, and description thereof will be appropriately omitted.

The representation image generation portion 31 of FIG. 15 is similar to the case of FIG. 13 in that it includes the image data acquisition portion 81 and the thumbnail generation portion 82.

However, the representation image generation portion 31 of FIG. 15 is different from the case of FIG. 13 in that it further includes a similarity calculation portion 83 and a selecting portion 84.

The representation image generation portion 31 of FIG. 15 is configured to calculate the degree of similarity representing the similarity between an image corresponding to the image data around the time represented by the timing information registered in the timing information list and an image corresponding to the image data around the time represented by other timing information. Furthermore, based on the degree of similarity, the representation image generation portion 31 selects timing information representing the time at which the representation image is not similar to other representation images, among the timing information registered in the timing information list, as final timing information representing the timing of the image data which will be used as the representation image data. Then, the representation image generation portion 31 generates representation image data from the image data around the time represented by the final timing information.

That is to say, in FIG. 15, the similarity calculation portion 83 is configured to receive the image data of the target contents (or the playback contents) from the image data acquisition portion 81. Furthermore, the similarity calculation portion 83 is configured to receive the timing information list of the target contents (or the playback contents) from the timing information storage portion 25.

The similarity calculation portion 83 sets the keywords registered in the timing information list supplied from the timing information storage portion 25 as a target keyword sequentially, and acquires timing information correlated with the target keyword as candidate timing information representing the candidates for the timing of an image which will be used as the representation image.

When one candidate timing information is acquired for the target keyword, the similarity calculation portion 83 supplies the one candidate timing information to the selecting portion 84 together with the target keyword.

Moreover, when a plurality of pieces of candidate timing information was acquired for the target keyword, the similarity calculation portion 83 sets images corresponding to the image data corresponding to the time represented by each of the plurality of pieces of candidate timing information of the target keyword as candidate images which will be used as the candidates for a representation image and calculates the degree of similarity between each candidate image and each image corresponding to the image data corresponding to the time represented by the timing information correlated with other keywords.

That is to say, the similarity calculation portion 83 calculates the degree of similarity between each of the plurality of candidate images corresponding to the time represented by the plurality of pieces of candidate timing information of the target keyword and each image corresponding to the time represented by the timing information (timing information correlated with keywords (other keywords) other than the target keyword) in the timing information list excluding the plurality of pieces of candidate timing information using the image data supplied from the image data acquisition portion 81.

Then, the similarity calculation portion 83 supplies the degree of similarity calculated between each of the plurality of candidate images (hereinafter also referred to as candidate images of the candidate timing information) corresponding to the time represented by the plurality of pieces of candidate timing information of the target keyword and an image (hereinafter also referred to as a similarity calculation target image) corresponding to the time represented by the timing information correlated with the other keywords and the candidate timing information to the selecting portion 84 together with the target keyword.

When one candidate timing information is supplied from the similarity calculation portion 83 with respect to the target keyword, the selecting portion 84 selects the one candidate timing information as the final timing information representing the timing of the image data which will be used as the representation image data and supplies the candidate timing information to the thumbnail generation portion 82 together with the target keyword supplied from the similarity calculation portion 83.

When a plurality of pieces of candidate timing information is supplied from the similarity calculation portion 83 with respect to the target keyword, the selecting portion 84 selects, as the final timing information, candidate timing information of a candidate image which is the least similar to the similarity calculation target image, among the plurality of candidate images of the plurality of pieces of candidate timing information, based on the degree of similarity supplied from the similarity calculation portion 83.

Then, the selecting portion 84 supplies the final timing information to the thumbnail generation portion 82 together with the target keyword supplied from the similarity calculation portion 83.

As described above, in FIG. 15, the thumbnail generation portion 82 receives the final timing information and the target keyword from the selecting portion 84. Furthermore, the thumbnail generation portion 82 receives the image data of the target contents from the image data acquisition portion 81.

The thumbnail generation portion 82 generates, as representation image data, thumbnail image data from the image data corresponding to the time represented by the final timing information among the image data supplied from the image data acquisition portion 81 based on the final timing information supplied from the selecting portion 84.

Then, the thumbnail generation portion 82 supplies the target keyword supplied from the selecting portion 84, namely the keyword correlated with the final timing information, and the thumbnail image data as the representation image data generated based on the final timing information to the display control portion 32 in a paired manner.

Here, as the degree of similarity between images calculated in the similarity calculation portion 83 (that is, the degree of similarity between the candidate image and the similarity calculation target image), a distance (metric) between images calculated from a color image histogram (e.g., RGB color histogram) may be used. A method of calculating the distance from a color image histogram is described, for example, in Y. Rubner, et al., "The Earth Mover's Distance as a Metric for Image Retrieval," International Journal of Computer Vision 40(2) pp. 99-121 (2000).

Furthermore, the degree of similarity may be calculated using the image data per se of the contents and may be calculated using the reduced image data of the image data of the contents. When the degree of similarity is calculated using the reduced image data of the image data of the contents, it is possible to decrease the amount of processing necessary for calculating the degree of similarity.

Processing Example of Second Exemplary Configuration of Representation Image Generation Portion 31

Figure 16:
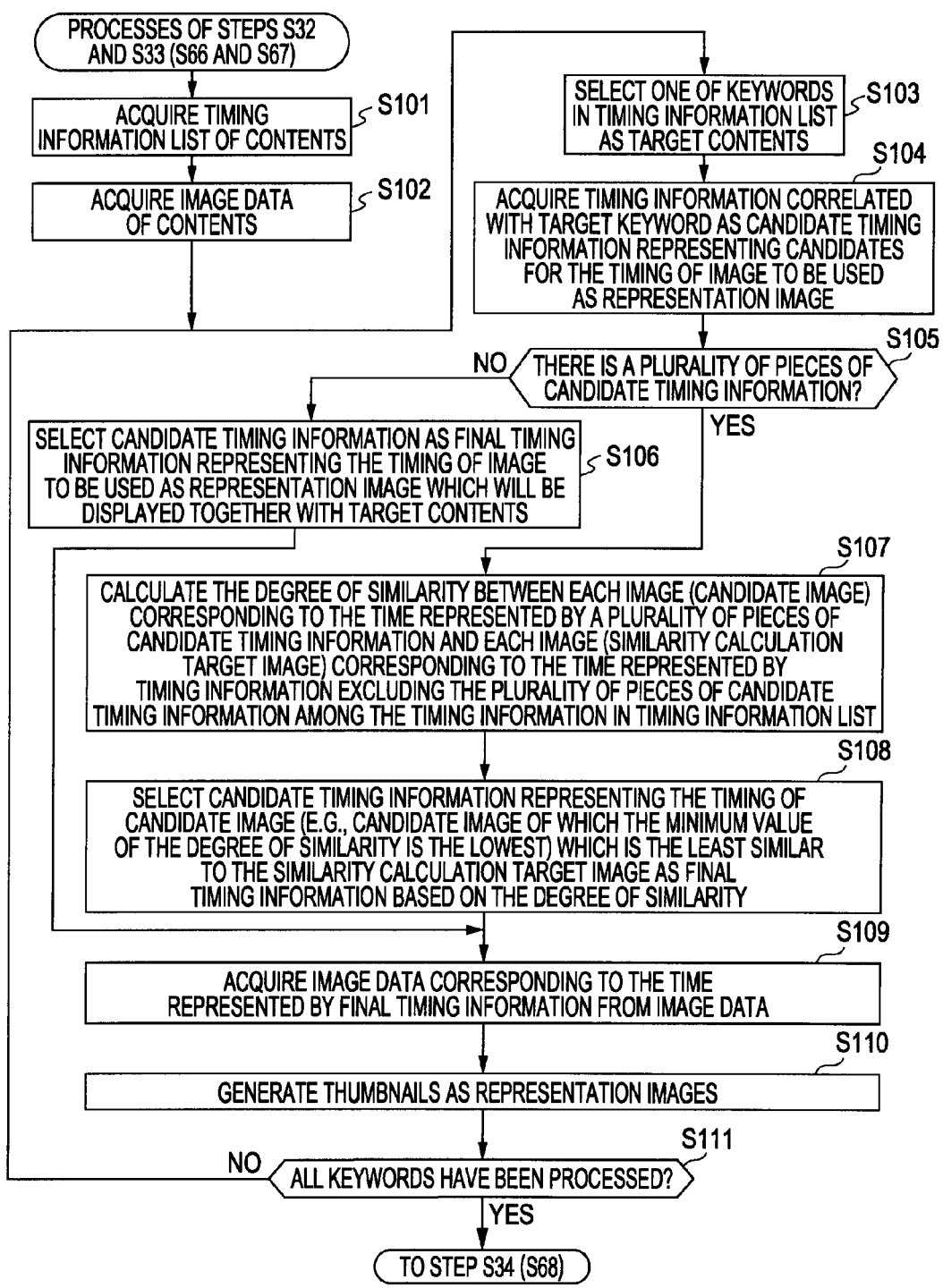
FIG. 16 is a flowchart illustrating a processing example according to the second exemplary configuration of the representation image generation portion.

With reference now to FIG. 16, the processing example of the second exemplary configuration of the representation image generation portion 31 of FIG. 15; that is, the processes of steps S32 and S33 in the playback process of FIG. 3 (and steps S66 and S67 of FIG. 10) will be described.

At step S101, the degree of similarity calculation portion 83 acquires a timing information list of the playback contents from the timing information storage portion 25, and then, the process flow proceeds to step S102.

At step S102, the image data acquisition portion 81 acquires the image data of the playback contents from the contents holding portion 12 and supplies the image data to the similarity calculation portion 83 and the thumbnail generation portion 82, and then, the process flow proceeds to step S103.

Here, the above-described processes of steps S101 and S102 are performed at step S32 of FIG. 3 (step S66 of FIG. 10). Moreover, the later-described processes of steps S103 to S111 are performed at step S33 of FIG. 3 (step S67 of FIG. 10).

At step S103, the similarity calculation portion 83 selects one keyword which has not been selected as a target keyword, among the keywords registered in the timing information list supplied from the timing information storage portion 25 as the target keyword, and then, the process flow proceeds to step S104.

At step S104, the similarity calculation portion 83 acquires timing information correlated with the target keyword from the timing information list supplied from the timing information storage portion 25 as candidate timing information, and then, the process flow proceeds to step S105.

At step S105, the similarity calculation portion 83 determines whether or not a plurality of pieces of candidate timing information is acquired with respect to the target keyword.

When it is determined at step S105 that a plurality of pieces of candidate timing information is not acquired with respect to the target keyword; that is, when one candidate timing information is acquired with respect to the target keyword, the similarity calculation portion 83 supplies the one candidate timing information to the selecting portion 84 together with the target keyword.

Then, the process flow proceeds from step S105 to step S106, and the selecting portion 84 selects one of the candidate timing information supplied from the similarity calculation portion 83 as the final timing information. Furthermore, at step S106, the selecting portion 84 supplies the final timing information to the thumbnail generation portion 82 together with the target keyword supplied from the similarity calculation portion 83, and then, the process flow proceeds to step S109.

When it is determined at step S105 that a plurality of pieces of candidate timing information is acquired with respect to the target keyword, then, the process flow proceeds to step S107, where the similarity calculation portion 83 sets images corresponding to the image data corresponding to the time represented by each of the plurality of pieces of candidate timing information of the target keyword as candidate images and calculates the degree of similarity between each of the plurality of candidate images and each image (similarity calculation target image) corresponding to the image data corresponding to the time represented by the timing information correlated with other keywords.

That is to say, the similarity calculation portion 83 calculates the degree of similarity between each of the plurality of candidate images corresponding to the time represented by the plurality of pieces of candidate timing information of the target keyword and the similarity calculation target image which is the image corresponding to the time represented by the timing information correlated with keywords (other keywords) other than the target keyword in the timing information list using the image data supplied from the image data acquisition portion 81.

Then, the similarity calculation portion 83 supplies the degree of similarity calculated between each of the plurality of candidate images of the plurality of pieces of candidate timing information of the target keyword and the similarity calculation target image to the selecting portion 84 together with the target keyword.

Then, the process flow proceeds from step S107 to step S108, and the selecting portion 84 selects, as the final timing information, candidate timing information of a candidate image which is the least similar to the similarity calculation target image, among the plurality of candidate images supplied from the similarity calculation portion 83, based on the degree of similarity supplied from the similarity calculation portion 83 with respect to the target keyword.

That is to say, if the degrees of similarity having smaller values represent the lower similarity, the selecting portion 84 detects the minimum value (or maximum value) of the degree of similarity between the similarity calculation target image and each of the plurality of candidate images. Furthermore, the selecting portion 84 sets a candidate image of which the minimum value (or maximum value) of the degree of similarity detected for each of the plurality of candidate images is the lowest (or highest) as the candidate image which is the least similar to the similarity calculation target image and selects the candidate timing information of the candidate image as the final timing information.

Then, the selecting portion 84 supplies the final timing information to the thumbnail generation portion 82 together with the target keyword supplied from the similarity calculation portion 83, and the process flow proceeds to step S109.

At step S109, the thumbnail generation portion 82 acquires the image data corresponding to the time represented by the final timing information supplied from the selecting portion 84 from the image data of the target contents supplied from the image data acquisition portion 81, and then, the process flow proceeds to step S110.

At step S110, the thumbnail generation portion 82 generates the thumbnail image data from the image data corresponding to the time represented by the final timing information as the representation image data.

Furthermore, at step S110, the thumbnail generation portion 82 supplies the target keyword supplied from the selecting portion 84 and the thumbnail image data as the representation image data generated based on the final timing information supplied from the selecting portion 84 to the display control portion 32 in a paired manner.

Then, the process flow proceeds from step S110 to step S111, and the similarity calculation portion 83 determines whether or not an entirety of the keywords registered in the timing information list supplied from the timing information storage portion 25 have been processed.

When it is determined at step S111 that the entirety of the keywords registered in the timing information list have not yet been processed, that is, when there is a keyword that is not yet used as the target keyword, among the keywords registered in the timing information list, then, the process flow returns to step S103. Then, at step S103, one of the keywords that have not yet been used as the keyword is selected as a new target keyword from the keywords registered in the timing information list, and the same processes are repeated.

When it is determined at step S111 that the entirety of the keywords registered in the timing information list have been processed, then, the process flow proceeds to step S34 of FIG. 3 (step S68 of FIG. 10).

As described above, when a plurality of pieces of timing information is correlated with a target keyword in the timing information list, the degree of similarity between the similarity calculation target image and the candidate images of each of the candidate timing information is calculated using the plurality of pieces of timing information as the candidate timing information. Then, based on the degree of similarity, the candidate timing information of the candidate image which is the least similar to the similarity calculation target images among the plurality of candidate images is selected as the final timing information. As a result, the plurality of representation images displayed on the display device 40 together with the keyword registered in the timing information list is composed of images which differ as much as possible.

Therefore, it is more possible to attract the user's attention than in the case of displaying similar images such as images of a newscaster as the representation images.

Another Processing Example of Second Exemplary Configuration of Representation Image Generation Portion 31

Figure 17:
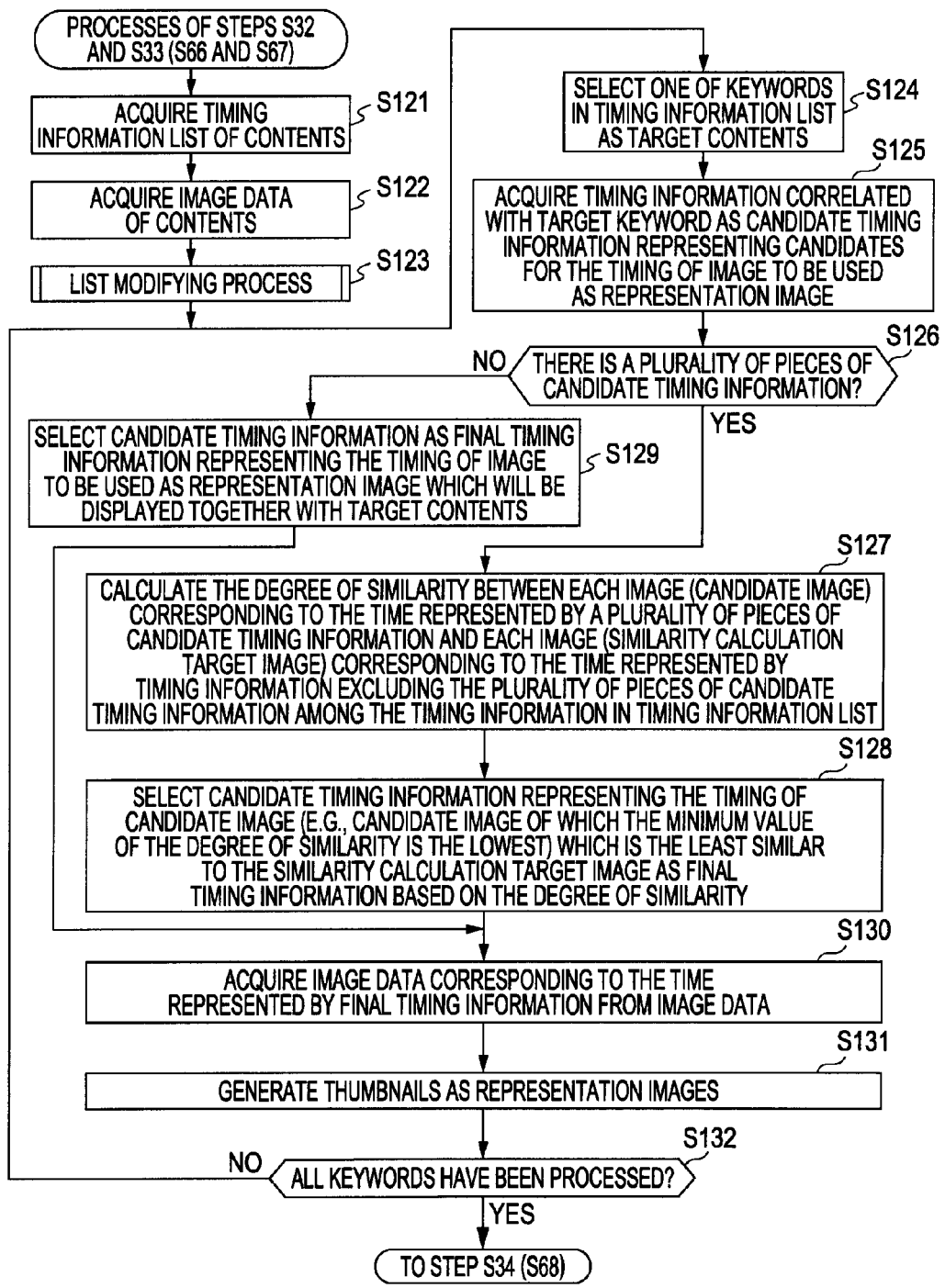
FIG. 17 is a flowchart illustrating another processing example according to the second exemplary configuration of the representation image generation portion.

With reference now to FIG. 17, another processing example of the second exemplary configuration of the representation image generation portion 31 of FIG. 15; that is, the processes of steps S32 and S33 in the playback process of FIG. 3 (steps S66 and S67 of FIG. 10) will be described.

Referring to FIG. 17, the same processes as steps S101 to S111 of FIG. 16 are performed at steps S121 and S122 and steps S124 and S132.

However, in FIG. 17, at step S123 between the steps S122 and S124, the similarity calculation portion 83 performs a list modifying process of modifying the timing information list acquired from the timing information storage portion 25.

List Modifying Process

Figure 18:
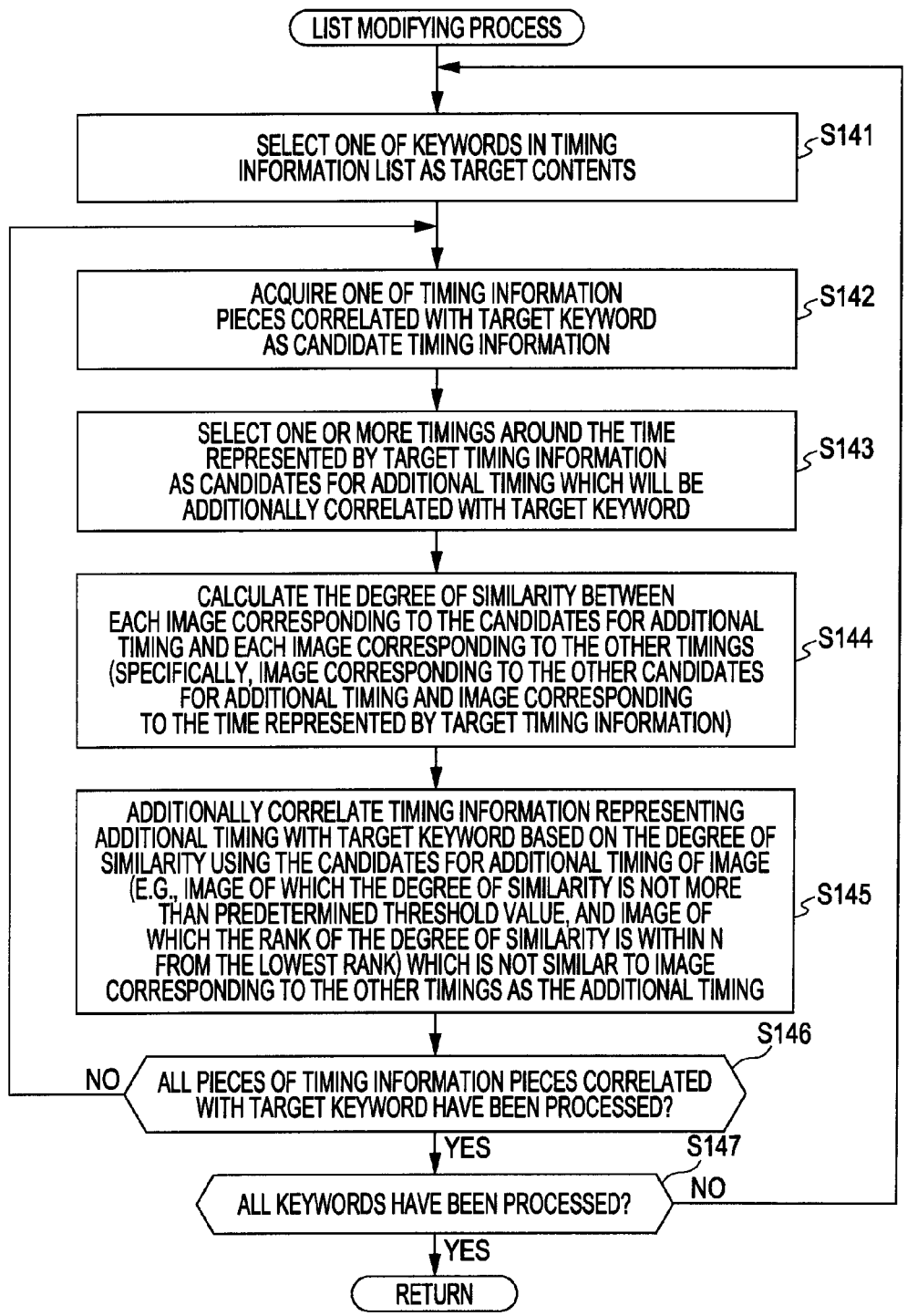
FIG. 18 is a flowchart illustrating a list modifying process.

With reference now to FIG. 18, the list modifying process performed by the similarity calculation portion 83 of FIG. 15 will be described.

At step S141, the similarity calculation portion 83 selects one keyword which has not been selected as a target keyword, among the keywords registered in the timing information list supplied from the timing information storage portion 25 as the target keyword, and then, the process flow proceeds to step S142.

At step S142, the similarity calculation portion 83 selects one of the timing information which has not been selected as the target timing information among the timing information correlated with the target keyword, from the timing information list supplied from the timing information storage portion 25, as target timing information, and then, the process flow proceeds to step S143.

At step S143, the similarity calculation portion 83 selects one or more timings around the time represented by the target timing information among the timings of the image data of the target contents supplied from the image data acquisition portion 81 as the candidates for additional timing which will be additionally correlated with the target keyword.

That is to say, the similarity calculation portion 83 selects timings other than the timings represented by the target timing information, among the timings that divide a predetermined time interval around the time represented by the target timing information into a predetermined number of brief time intervals, as the candidates for additional timing. Here, the length of the predetermined time interval and the number of brief time intervals dividing the predetermined time interval may have a fixed value or may have a variable value that is determined by random numbers, for example.

Then, the process flow proceeds from step S143 to step S144, and the similarity calculation portion 83 calculates the degree of similarity between each image corresponding to one or more candidates for additional timing and each image corresponding to the other timings.

Here, among the images corresponding to one or more candidates for additional timing, an image for which the degree of similarity is calculated will be regarded as a target image.

The "images corresponding to the other timings", for which the degree of similarity with the target image is calculated at step S144, refer to an image excluding the target image among the images corresponding to one or more candidates for additional timing and an image corresponding to the time represented by the target timing information.

Then, the process flow proceeds from step S144 to step S145, where based on the degree of similarity calculated at step S144, the similarity calculation portion 83 determines the timings (the candidates for additional timing) of the images which are not similar to the images corresponding to the other timings, among the images of the one or more candidates for additional timing, as additional timing.

That is to say, for example, if the degrees of similarity having larger values represent the higher similarity, the similarity calculation portion 83 selects images of which the degree of similarity with the images of the other timings is not more than a threshold value such as the minimum value or maximum value or images of which the rank of the degree of similarity is within N (N>1) from the lowest rank, among the images corresponding to the one or more candidates for additional timing, as the images which are not similar to the images corresponding to the other timings, and determines the timings (the candidates for additional timing) of the images as the additional timing.

Furthermore, at step S145, the similarity calculation portion 83 registers the timing information representing the additional timing in the timing information list in the form of additionally correlating the timing information with the target keyword, and then, the process flow proceeds to step S146.

At step S146, the similarity calculation portion 83 determines whether or not an entirety of the timing information correlated with the target keyword has been processed.

When it is determined at step S146 that the entirety of the timing information correlated with the target keyword has not yet been processed; that is, when there is timing information which has not been selected as the target timing information among the timing information correlated with the target keyword, then, the process flow returns to step S142.

Then, the processes of steps S142 to S146 are repeated.

According to the processes of steps S142 to S146, among one or more timings around the time represented by the target timing information correlated with the target keyword, timing information representing the timings of images which are not similar to each other (images which are not similar to the images corresponding to the time represented by the target timing information) is additionally correlated with the target keyword.

When it is determined at step S146 that the entirety of the timing information correlated with the target keyword has been processed, then, the process flow proceeds to step S147, where the similarity calculation portion 83 determines whether or not an entirety of the keywords registered in the timing information list have been processed.

When it is determined at step S147 that the entirety of the keywords registered in the timing information list have not yet been processed; that is, when there is a keyword that has not been selected as the target keyword, among the keywords registered in the timing information list, then, the process flow returns to step S141.

Then, the processes of steps S141 to S147 are repeated.

When it is determined at step S147 that the entirety of the keywords registered in the timing information list have been processed, then, the process flow returns to a main routine.

As described above, in the list modifying process, the timings of images which are not similar to each other as much as possible among one or more timings (the candidates for additional timing) around the time represented by the timing information registered in the timing information list. Then, the timing information representing the additional timing is additionally added to the timing information list, thus modifying the timing information list.

Thereafter, in FIG. 17, using the modified timing information list, the same processes as steps S103 to S111 of FIG. 16 are performed at steps S124 to S132.

Therefore, according to the processing of FIG. 17, thumbnails of images which are not similar to each other are displayed as the representation images together with keywords.

As a result, since the processing of FIG. 17 is performed in the specific content retrieval process of FIG. 10, thumbnails of scenes which are not similar to each other are displayed with respect to the contents containing utterance of keywords acquired from the inputs from the user. Therefore, the user is able to grasp the details of the contents at one glance and easily find the contents that the user is interested in than in the case of displaying the thumbnails of similar scenes.

Computer Implementing the Present Invention

The above-described processing series can be executed not only by hardware but also by software. When the processing series is executed by software, a program included in the software is installed in a general-purpose computer.

With reference now to FIG. 19, an exemplary configuration of a computer according to an embodiment of the present invention, in which program for executing the above-described processing series is installed.

The program may be first recorded in a hard disk 105 or a ROM 103 as a recording medium installed in the computer.

Alternatively, the program may be stored (recorded) in a removable storage medium 111. The removable storage medium 111 may be provided as a so-called package software. Here, the removable storage medium 111 may be a flexible disk, a CD-ROM (compact disc read only memory), a MO (magneto optical) disc, a DVD (digital versatile disc), a magnetic disc, or a semiconductor memory.

The program may be installed in the internal hard disk 105 by downloading the program via a communication network or a broadcasting network, in addition to installing the program in the computer from the removable storage medium 111 as described above. That is to say, the program may be wirelessly transferred from a download site to the computer via a digital broadcasting satellite or may be transferred through wires to the computer via a network such as a LAN (local area network) or the Internet.

The computer has incorporated therein a CPU (central processing unit) 102, and an input/output interface 110 is connected to the CPU 102 via a bus 101.

The CPU 102 executes a program stored in the ROM (read only memory) 103 in response to, and in accordance with, commands which are input via the input/output interface 110 by a user operating an input unit 107 or the like. Alternatively, the CPU 102 executes a program stored in the hard disk 105 by loading the program in a RAM (random access memory) 104.

In this way, the CPU 102 executes the processing corresponding to the above-described flowcharts or the processing performed by the configuration illustrated in the block diagrams. Then, the CPU 102 outputs, transmits, or records the processing results through an output unit 106, through a communication unit 108, or in the hard disk 105, for example, via the input/output interface 110 as necessary.

The input unit 107 includes a keyboard, a mouse, a microphone, and the like. The output unit 106 includes an LCD (liquid crystal device), a speaker, and the like.

Here, in this specification, the processing that the computer executes in accordance with the program may not be executed in a time-sequential manner in the order described in the flowcharts. That is to say, the processing that the computer executes in accordance with the program includes processing that is executed in parallel and/or separately (for example, parallel processing or object-based processing).

Moreover, the program may be executed by a single computer (processor) and may be executed by a plurality of computers in a distributed manner. Furthermore, the program may be executed by being transferred to a computer at a remote location.

The present application contains subject matter related to that disclosed in Japanese Priority Patent Application JP 2009-003688 filed in the Japan Patent Office on Jan. 9, 2009, the entire content of which is hereby incorporated by reference.

The embodiments of the present invention are not limited to the above-described embodiments, but various modifications can be made in a range not departing from the gist of the present invention.

For example, the text acquisition portion 21 may be configured by the related text acquisition unit 50 of FIG. 4 and the user-input acquisition portion 61 of FIG. 8.

What is claimed is:

1. A data processing apparatus comprising:
    text acquisition means for acquiring texts to be used as keywords which will be subject to audio retrieval, the texts being related to contents corresponding to contents data including video image data and audio data;
    keyword acquisition means for acquiring the keywords from the texts, each keyword being acquired as a sequence of one or more phonemes;
    audio retrieval means for retrieving utterance of the keywords from the audio data of the contents data and acquiring timing information representing the timing of the utterance of the keywords of which the utterance is retrieved;
    playback control means for generating, from the video image data around the time represented by the timing information, representation image data of a representation image which is a video frame or video clip, and for performing playback control of displaying the representation image corresponding to the representation image data together with corresponding keywords which are uttered at the time represented by the timing information; and
    timing information storage means for storing a timing information list of target contents in which each keyword for which utterance is retrieved by the audio retrieval means is correlated with timing information representing the timing of the utterance of each uttered keyword.

2. The data processing apparatus according to claim 1, wherein the playback control means is configured to:
    calculate a degree of similarity between an image corresponding to the video image data around the time represented by the timing information and an image corresponding to video image data near the time represented by other timing information;
    select, based on the degree of similarity, timing information representing the time, at which the representation image is not similar to other representation images, among the timing information acquired by the audio retrieval means, as final timing information representing the timing of video image data which will be used as the reference distance information; and
    generate the representation image data from video image data around the timing represented by the final timing information.

3. The data processing apparatus according to claim 2, wherein the playback control means is further configured to:
    sequentially set each of the keywords registered in the timing information list as a target keyword;
    when the target keyword is correlated with a single piece of timing information, select the one timing information as the final timing information; and
    when the target keyword is correlated with a plurality of pieces of timing information,
        calculate a degree of similarity between each of a plurality of candidate images, which are images corresponding to video image data corresponding to the time represented by the plurality of pieces of timing information, and each of one or more similarity calculation target images, which are images corresponding to video image data corresponding to the time represented by timing information excluding the plurality of pieces of timing information among the timing information registered in the timing information list; and
        select, based on the degree of similarity, the timing information of a candidate image, which is the least similar to the similarity calculation target image among the candidate images, as the final timing information.

4. The data processing apparatus according to claim 1, wherein:
    the contents data further include caption data; and
    the text acquisition means acquires the caption data of the contents data as the texts.

5. The data processing apparatus according to claim 4, wherein the audio retrieval means performs the retrieval of the utterance of the keywords with respect only to audio data around the time at which a caption corresponding to the caption data is displayed.

6. The data processing apparatus according to claim 1, wherein the text acquisition means acquires metadata of contents corresponding to the contents data as the texts.

7. The data processing apparatus according to claim 6, wherein:
the contents are television broadcast programs; and
the metadata of the contents are EPG (electronic program guide) data.

8. The data processing apparatus according to claim 1, wherein the text acquisition means acquires inputs from a user as the texts.

9. The data processing apparatus according to claim 8, wherein the text acquisition means acquires inputs from a keyboard operated by the user or the results of speech recognition of the user's speech as the texts.

10. The data processing apparatus according to claim 1, wherein the audio retrieval means is configured to:
generate phonemes of the audio data of the contents data;
generate an index of the timing information of the phonemes generated from the audio data;
find, within the index, sequences of phonemes that form the keywords; and
determine timing information representing the timing of the utterance of the keywords from the index.

11. The data processing apparatus according to claim 6, wherein the text acquisition means acquires the metadata from the Internet.

12. A data processing method comprising the steps of:
acquiring texts to be used as keywords which will be subject to audio retrieval, the texts being related to contents corresponding to contents data including video image data and audio data;
acquiring the keywords from the texts, each keyword being acquired as a sequence of one or more phonemes;
retrieving utterance of the keywords from the audio data of the contents data and acquiring timing information representing the timing of the utterance of the keywords of which the utterance is retrieved;
storing a timing information list of target contents in which each keyword for which utterance is retrieved by the audio retrieval means is correlated with timing information representing the timing of the utterance of each uttered keyword;
generating, from the video image data around the time represented by the timing information, representation image data of a representation image which is a video frame or video clip; and
performing playback control of displaying the representation image corresponding to the representation image data together with corresponding keywords which are uttered at the time represented by the timing information.

13. The data processing method according to claim 12, wherein the step of generating representation image data further comprises:
calculating a degree of similarity between an image corresponding to the video image data around the time represented by the timing information and an image corresponding to video image data near the time represented by other timing information;
selecting, based on the degree of similarity, timing information representing the time, at which the representation image is not similar to other representation images, among the timing information acquired by the audio retrieval means, as final timing information representing the timing of video image data which will be used as the reference distance information; and
generating the representation image data from video image data around the timing represented by the final timing information.

14. The data processing method according to claim 13, wherein the step of generating representation image data further comprises:
sequentially setting each of the keywords registered in the timing information list as a target keyword;
when the target keyword is correlated with a single piece of timing information, selecting the one timing information as the final timing information; and
when the target keyword is correlated with a plurality of pieces of timing information,
calculating a degree of similarity between each of a plurality of candidate images, which are images corresponding to video image data corresponding to the time represented by the plurality of pieces of timing information, and each of one or more similarity calculation target images, which are images corresponding to video image data corresponding to the time represented by timing information excluding the plurality of pieces of timing information among the timing information registered in the timing information list; and
selecting, based on the degree of similarity, the timing information of a candidate image, which is the least similar to the similarity calculation target image among the candidate images, as the final timing information.

15. The data processing method according to claim 12, wherein:
the contents data further include caption data; and
the step of acquiring texts further comprises acquiring the caption data as the texts.

16. The data processing method according to claim 15, wherein the step of retrieving utterances of the key words from the audio data is performed with respect only to audio data around the time at which a caption corresponding to the caption data is displayed.

17. The data processing method according to claim 12, the step of acquiring texts further comprises acquiring metadata of contents corresponding to the contents data as the texts.

18. The data processing method according to claim 17, wherein:
the contents are television broadcast programs; and
the metadata of the contents are EPG (electronic program guide) data.

19. The data processing method according to claim 17, wherein the step of acquiring metadata further comprises acquiring metadata from the Internet.

20. The data processing method according to claim 12, wherein the step of acquiring texts further comprises the step of acquiring user inputs as the texts.

21. The data processing method according to claim 20, wherein the step of acquiring user inputs as the texts further comprises:
acquiring inputs from a keyboard operated by the user as the texts; or
acquiring the results of speech recognition of the user's speech as the texts.

22. The data processing method according to claim 12, wherein the step of retrieving utterance of keywords from the audio data further comprises:

generating phonemes of the audio data of the contents data;
generating an index of the timing information of the phonemes generated from the audio data; and
finding, within the index, sequences of phonemes that form the keywords.

23. The data processing method according to claim 22, wherein the step of acquiring timing information representing the timing of the utterance of the keywords further comprises determining timing information representing the timing of the utterance of the keywords from the index.

24. A non-transitory computer-readable storage medium storing a program that, when executed by a computer, causes the computer to execute data processing, including the steps of:
acquiring texts to be used as keywords which will be subject to audio retrieval, the texts being related to contents corresponding to contents data including video image data and audio data;
acquiring the keywords from the texts, each keyword being acquired as a sequence of one or more phonemes;
retrieving utterance of the keywords from the audio data of the contents data and acquiring timing information representing the timing of the utterance of the keywords of which the utterance is retrieved;
storing a timing information list of target contents in which each keyword for which utterance is retrieved by the audio retrieval means is correlated with timing information representing the timing of the utterance of each uttered keyword;
generating, from the video image data around the time represented by the timing information, representation image data of a representation image which is a video frame or video clip; and
performing playback control of displaying the representation image corresponding to the representation image data together with corresponding keywords which are uttered at the time represented by the timing information.

25. A data processing apparatus comprising:
a computer including a central processing unit, a recording medium configured to store a program, and an input/output interface,
wherein the computer further includes:
a timing information acquisition unit, the timing information acquisition unit including,
a text acquisition portion configured to acquire texts to be used as keywords which will be subject to audio retrieval, the texts being related to contents corresponding to contents data including video image data and audio data;
a keyword acquisition portion configured to acquire the keywords from the texts, each keyword being acquired as a sequence of one or more phonemes;
an audio retrieval portion configured to retrieve utterance of the keywords from the audio data of the contents data and acquire timing information representing the timing of the utterance of the keywords of which the utterance is retrieved; and
a timing information storage unit configured to store a timing information list of target contents in which each keyword for which utterance is retrieved by the audio retrieval means is correlated with timing information representing the timing of the utterance of each uttered keyword; and
a playback control unit configured to generate, from the video image data around the time represented by the timing information, representation image data of a representation image which is a video frame or video clip, and perform playback control of displaying the representation image corresponding to the representation image data together with keywords which are uttered at the time represented by the timing information.

* * * * *